US011067692B2

United States Patent
Lungenschmied et al.

(10) Patent No.: US 11,067,692 B2
(45) Date of Patent: Jul. 20, 2021

(54) DETECTOR FOR DETERMINING A POSITION OF AT LEAST ONE OBJECT

(71) Applicant: trinamiX GmbH, Ludwigshafen am Rhein (DE)

(72) Inventors: Christoph Lungenschmied, Ludwigshafen (DE); Oili Pekkola, Ludwigshafen (DE); Patrick Schindler, Ludwigshafen (DE); Robert Send, Ludwigshafen (DE); Ingmar Bruder, Ludwigshafen (DE); Erwin Thiel, Ludwigshafen (DE); Stephan Irle, Ludwigshafen (DE)

(73) Assignee: trinamiX GmbH, Ludwigshafen am Rhein (DE)

( * ) Notice: Subject to any disclaimer, the term of this patent is extended or adjusted under 35 U.S.C. 154(b) by 14 days.

(21) Appl. No.: 16/623,557

(22) PCT Filed: Jun. 25, 2018

(86) PCT No.: PCT/EP2018/066942
§ 371 (c)(1),
(2) Date: Dec. 17, 2019

(87) PCT Pub. No.: WO2019/002199
PCT Pub. Date: Jan. 3, 2019

(65) Prior Publication Data
US 2021/0088664 A1 Mar. 25, 2021

(30) Foreign Application Priority Data
Jun. 26, 2017 (EP) .................................... 17177871

(51) Int. Cl.
*G01S 17/46* (2006.01)
*G01S 7/481* (2006.01)
*G01S 17/42* (2006.01)

(52) U.S. Cl.
CPC .............. *G01S 17/46* (2013.01); *G01S 7/481* (2013.01); *G01S 17/42* (2013.01)

(58) Field of Classification Search
CPC .......... G01S 17/46; G01S 7/481; G01S 17/42
See application file for complete search history.

(56) References Cited

U.S. PATENT DOCUMENTS

| 3,035,176 A | 5/1962 | Kis et al. |
| 3,112,197 A | 11/1963 | Neugebauer et al. |

(Continued)

FOREIGN PATENT DOCUMENTS

| CA | 1065054 | 10/1979 |
| CA | 2196563 | 12/1996 |

(Continued)

OTHER PUBLICATIONS

Extended Search Report dated Aug. 23, 2011 in Europe Application No. 11154531.5 (With English Translation of Category of Cited Documents).

(Continued)

*Primary Examiner* — Jamil Ahmed
(74) *Attorney, Agent, or Firm* — Armstrong Teasdale LLP

(57) ABSTRACT

A method for adjusting a detector (110) for determining a position of at least one object (112) within a range of measurement (114) is disclosed. The detector (110) comprises at least two longitudinal optical sensors (116) and at least one transfer device (118) for imaging the object (112) into an image plane. The transfer device (118) has a focal plane. The transfer device (118) is positioned in between the longitudinal optical sensors (116) and the object (112). Each of the longitudinal optical sensors (116) has at least one sensor region (120). Each of the longitudinal optical sensors (116) is designed to generate at least one longitudinal sensor (Continued)

signal in a manner dependent on an illumination of the respective sensor region (120) by at least one light beam (178) propagating from the object (112) to the detector (110), wherein the longitudinal sensor signal, given the same total power of the illumination, is dependent on a beam cross-section of the light beam (178) in the sensor region (120). The detector (110) further comprises at least one evaluation device (124). The method comprises the following steps: (i) subsequently moving the object (112) longitudinally to at least two different calibration positions (134, 136) having at least two different longitudinal coordinates within the range of measurement (114); (ii) recording, for each of the calibration positions (134, 136), at least one first longitudinal sensor signal generated by a first longitudinal optical sensor (126) and at least one second longitudinal sensor signal generated by a second longitudinal optical sensor (128); (iii) forming, for each of the calibration positions (134, 126), at least one calibration signal using the first and second longitudinal sensor signals; (iv) generating a calibration function using the calibration signals, the calibration function defining a relationship between the longitudinal coordinate of the object (112) and the first and second longitudinal sensor signals.

18 Claims, 5 Drawing Sheets

(56) References Cited

U.S. PATENT DOCUMENTS

| | | |
|---|---|---|
| 3,384,752 A | 5/1968 | Odone |
| 3,562,785 A | 2/1971 | Craig |
| 3,564,268 A | 2/1971 | Bayne et al. |
| 3,937,950 A | 2/1976 | Hosoe et al. |
| 3,954,340 A | 5/1976 | Blomqvist et al. |
| 4,023,033 A | 5/1977 | Bricot et al. |
| 4,053,240 A | 10/1977 | Aizawa et al. |
| 4,079,247 A | 3/1978 | Briscot et al. |
| 4,256,513 A | 3/1981 | Yoshida |
| 4,286,035 A | 8/1981 | Nishizima et al. |
| 4,346,293 A | 8/1982 | Fetzer |
| 4,469,945 A | 9/1984 | Hoeberechts et al. |
| 4,524,276 A | 6/1985 | Ohtombe |
| 4,565,761 A | 1/1986 | Katagiri et al. |
| 4,584,704 A | 4/1986 | Ferren |
| 4,593,187 A | 6/1986 | Grotts et al. |
| 4,602,158 A | 7/1986 | Barrett |
| 4,603,258 A | 7/1986 | Sher et al. |
| 4,647,193 A | 3/1987 | Rosenfeld |
| 4,675,535 A | 6/1987 | Tsunekawa et al. |
| 4,694,172 A | 9/1987 | Powell et al. |
| 4,760,004 A | 7/1988 | Rochat et al. |
| 4,760,151 A | 7/1988 | Rochat et al. |
| 4,767,211 A | 8/1988 | Munakata et al. |
| 4,773,751 A | 9/1988 | Matsuda et al. |
| 4,927,721 A | 5/1990 | Gratzel et al. |
| 4,952,472 A | 8/1990 | Baranyi et al. |
| 5,082,363 A | 1/1992 | Nakanishi et al. |
| 5,216,476 A | 6/1993 | Lanckton |
| 5,227,985 A | 7/1993 | Dementhon et al. |
| 5,291,066 A | 3/1994 | Neugebauer et al. |
| 5,350,644 A | 9/1994 | Graetzel et al. |
| 5,355,241 A | 10/1994 | Kelley |
| 5,375,008 A | 12/1994 | Guerreri |
| 5,581,094 A | 12/1996 | Hara et al. |
| 5,589,928 A | 12/1996 | Babbitt et al. |
| 5,856,844 A | 1/1999 | Batterman et al. |
| 6,061,122 A | 5/2000 | Hoshino et al. |
| 6,191,881 B1 | 2/2001 | Tajima |
| 6,266,142 B1 | 7/2001 | Junkins et al. |
| 6,359,211 B1 | 3/2002 | Spitler et al. |
| 6,417,836 B1 | 7/2002 | Kumar et al. |
| 6,512,233 B1 | 1/2003 | Sato et al. |
| 6,785,028 B1 | 8/2004 | Atsuumi et al. |
| 6,930,297 B1 | 8/2005 | Nakamura |
| 6,995,445 B2 | 2/2006 | Forrest et al. |
| 7,022,966 B2 | 4/2006 | Gonzo et al. |
| 7,049,601 B2 | 5/2006 | Agano |
| 7,196,317 B1 | 3/2007 | Meissner et al. |
| 7,247,851 B2 | 7/2007 | Okada et al. |
| 7,301,608 B1 | 11/2007 | Mendenhall et al. |
| 7,417,716 B2 | 8/2008 | Nagasaka et al. |
| 7,626,569 B2 | 12/2009 | Lanier |
| 7,677,742 B2 | 3/2010 | Hillmer et al. |
| 7,768,498 B2 | 8/2010 | Wey |
| 7,773,070 B2 | 8/2010 | Trisnadi et al. |
| 7,939,932 B2 | 5/2011 | Martin |
| 8,013,901 B2 | 9/2011 | Fukuhara et al. |
| 8,019,166 B2 | 9/2011 | Cheng et al. |
| 8,107,056 B1 | 1/2012 | Riza |
| 8,144,173 B2 | 3/2012 | Baba |
| 8,228,299 B1 | 7/2012 | Maloney et al. |
| 8,231,809 B2 | 7/2012 | Pschirer et al. |
| 8,345,003 B1 | 1/2013 | Trisnadi et al. |
| 8,363,526 B2 | 1/2013 | Hotta et al. |
| 8,390,793 B2 | 3/2013 | Yamaguchi et al. |
| 8,411,289 B2 | 4/2013 | Takahashi |
| 8,477,580 B2 | 7/2013 | Yamamoto et al. |
| 8,563,855 B2 | 10/2013 | Pschirer et al. |
| 8,593,565 B2 | 11/2013 | Shuster |
| 8,902,354 B2 | 12/2014 | Shuster |
| 8,908,157 B2 | 12/2014 | Eisele et al. |
| 9,104,910 B2 | 8/2015 | Huang |
| 9,385,326 B2 | 7/2016 | Wonneberger et al. |
| 9,389,315 B2 | 7/2016 | Bruder et al. |
| 9,428,518 B2 | 8/2016 | Wonneberger et al. |
| 9,557,856 B2 | 1/2017 | Send et al. |
| 9,665,182 B2 | 5/2017 | Send et al. |
| 9,741,954 B2 | 8/2017 | Bruder et al. |
| 9,829,564 B2 | 11/2017 | Bruder et al. |
| 9,919,999 B2 | 3/2018 | Koenemann et al. |
| 9,958,535 B2 | 5/2018 | Send et al. |
| 9,989,623 B2 | 6/2018 | Send et al. |
| 10,012,532 B2 | 7/2018 | Send et al. |
| 10,094,927 B2 | 10/2018 | Send et al. |
| 10,120,078 B2 | 11/2018 | Bruder et al. |
| 2001/0025938 A1 | 10/2001 | Imai |
| 2002/0011576 A1 | 1/2002 | Cho et al. |
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0190117 A1 | 9/2004 | Kubaink |
| 2004/0216625 A1 | 11/2004 | Birnstock et al. |
| 2005/0052120 A1 | 3/2005 | Gupta et al. |
| 2005/0061957 A1 | 3/2005 | Kase |
| 2005/0122308 A1 | 6/2005 | Bell et al. |
| 2005/0184301 A1 | 8/2005 | Nagasaka et al. |
| 2005/0217720 A1 | 10/2005 | Rey-Mermet et al. |
| 2005/0227390 A1 | 10/2005 | Shtein et al. |
| 2005/0227406 A1 | 10/2005 | Shtein et al. |
| 2005/0268957 A1 | 12/2005 | Enomoto et al. |
| 2005/0269616 A1 | 12/2005 | Andriessen |
| 2006/0049397 A1 | 3/2006 | Pfeiffer et al. |
| 2006/0065833 A1 | 3/2006 | Craig et al. |
| 2006/0075585 A1 | 4/2006 | Krieger et al. |
| 2006/0082546 A1 | 4/2006 | Wey |
| 2007/0008515 A1 | 1/2007 | Otani et al. |
| 2007/0010924 A1 | 1/2007 | Otani et al. |
| 2007/0046625 A1 | 3/2007 | Yee |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2007/0183047 A1 | 8/2007 | Phillips et al. |
| 2007/0206181 A1 | 9/2007 | Arenberg et al. |
| 2008/0080789 A1 | 4/2008 | Marks |
| 2008/0157965 A1 | 7/2008 | Shahar |

(56) References Cited

U.S. PATENT DOCUMENTS

| | | |
|---|---|---|
| 2008/0170750 A1 | 7/2008 | Gordon |
| 2008/0259310 A1 | 10/2008 | Wada |
| 2008/0269482 A1 | 10/2008 | Pschirer et al. |
| 2008/0284925 A1 | 11/2008 | Han |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0097010 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2009/0322677 A1 | 12/2009 | Lee et al. |
| 2010/0073462 A1 | 3/2010 | Lee et al. |
| 2010/0091263 A1 | 4/2010 | Kumagai et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0032365 A1 | 2/2011 | Yett |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0123188 A1 | 5/2011 | Cardwell et al. |
| 2011/0127788 A1 | 6/2011 | Nakanishi |
| 2011/0181553 A1 | 7/2011 | Brown et al. |
| 2011/0194097 A1 | 8/2011 | Yamaguchi et al. |
| 2011/0284756 A1 | 11/2011 | Miko et al. |
| 2011/0286661 A1 | 11/2011 | Lee et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0013885 A1 | 1/2012 | Yang et al. |
| 2012/0061587 A1 | 3/2012 | Wu |
| 2012/0062517 A1 | 3/2012 | Lai et al. |
| 2012/0063287 A1 | 3/2012 | Yamamoto et al. |
| 2012/0146028 A1 | 6/2012 | Oda et al. |
| 2012/0160298 A1 | 6/2012 | Kanamoto et al. |
| 2012/0206336 A1 | 8/2012 | Bruder |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0289672 A1 | 11/2012 | Kastler et al. |
| 2012/0293651 A1 | 11/2012 | Kawamata et al. |
| 2012/0320160 A1 | 12/2012 | Drazic |
| 2012/0328906 A1 | 12/2012 | Kwon et al. |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0242283 A1 | 9/2013 | Bailey et al. |
| 2013/0271818 A1 | 10/2013 | Maxik et al. |
| 2013/0320302 A1 | 12/2013 | Park et al. |
| 2014/0015242 A1 | 1/2014 | Forrest |
| 2014/0066656 A1 | 3/2014 | Bruder et al. |
| 2014/0078376 A1 | 3/2014 | Shuster |
| 2014/0124782 A1 | 5/2014 | Jung et al. |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0233028 A1 | 8/2014 | Englund |
| 2014/0291480 A1 | 10/2014 | Bruder et al. |
| 2014/0347442 A1 | 11/2014 | Wang et al. |
| 2014/0368726 A1 | 12/2014 | Gladnick |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0286340 A1 | 10/2015 | Send et al. |
| 2015/0346911 A1 | 12/2015 | Christiansson |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1* | 5/2016 | Send ............... G01C 3/32 250/221 |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0248021 A1 | 8/2016 | Sundarraj et al. |
| 2016/0266257 A1 | 9/2016 | Bruder et al. |
| 2016/0320489 A1 | 11/2016 | Send et al. |
| 2016/0364015 A1 | 12/2016 | Send et al. |
| 2017/0039793 A1 | 2/2017 | Send et al. |
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0067213 A1 | 3/2018 | Send et al. |
| 2018/0136319 A1 | 5/2018 | Send et al. |
| 2018/0210064 A1 | 7/2018 | Send et al. |
| 2018/0231376 A1 | 8/2018 | Send et al. |
| 2018/0238993 A1 | 8/2018 | Send et al. |
| 2018/0249051 A1 | 8/2018 | Send et al. |
| 2018/0276843 A1 | 9/2018 | Send et al. |
| 2018/0329024 A1 | 11/2018 | Send et al. |
| 2018/0356501 A1 | 12/2018 | Send et al. |
| 2019/0129035 A1 | 5/2019 | Valouch et al. |
| 2019/0129036 A1 | 5/2019 | Valouch et al. |
| 2019/0140129 A1 | 5/2019 | Valouch et al. |
| 2019/0157470 A1 | 5/2019 | Send et al. |
| 2019/0170849 A1 | 6/2019 | Hermes et al. |
| 2019/0172964 A1 | 6/2019 | Hermes et al. |
| 2019/0277703 A1 | 9/2019 | Valouch et al. |

FOREIGN PATENT DOCUMENTS

| | | |
|---|---|---|
| CN | 1270706 | 10/2000 |
| CN | 1677053 A | 10/2005 |
| CN | 1723564 A | 1/2006 |
| CN | 1777859 | 5/2006 |
| CN | 1809801 A | 7/2006 |
| CN | 1896686 A | 1/2007 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549381 A | 7/2012 |
| CN | 102737435 | 10/2012 |
| CN | 102833569 | 12/2012 |
| CN | 103106411 A | 5/2013 |
| CN | 103322910 A | 9/2013 |
| CN | 103403494 | 11/2013 |
| CN | 103492835 | 1/2014 |
| CN | 103649677 | 3/2014 |
| CN | 103650478 | 3/2014 |

(56) References Cited

FOREIGN PATENT DOCUMENTS

| | | |
|---|---|---|
| DE | 2 417 854 | 10/1974 |
| DE | 25 01 124 A1 | 8/1975 |
| DE | 32 25 372 A1 | 2/1983 |
| DE | 42 11 875 | 10/1993 |
| DE | 196 04 856 | 8/1997 |
| DE | 10146752 | 4/2002 |
| DE | 10 2005 043 627 | 3/2007 |
| DE | 10 2005 053 995 | 5/2007 |
| DE | 10 2007 037 875 A1 | 2/2009 |
| DE | 20 2012 009 070 | 1/2013 |
| DE | 10 2014 108 353 A1 | 12/2014 |
| EP | 0 112 169 A2 | 6/1984 |
| EP | 0 185 450 A2 | 6/1986 |
| EP | 0 309 631 | 4/1989 |
| EP | 0 754 930 A2 | 1/1997 |
| EP | 1 176 646 A1 | 1/2002 |
| EP | 1 191 819 | 3/2002 |
| EP | 1 330 117 | 7/2003 |
| EP | 1 373 272 | 1/2004 |
| EP | 1 667 246 A1 | 6/2006 |
| EP | 1 832 910 | 9/2007 |
| EP | 1 947 477 | 7/2008 |
| EP | 2 205 657 A1 | 7/2010 |
| EP | 2 220 141 A1 | 8/2010 |
| EP | 2 507 286 A2 | 10/2012 |
| EP | 2 527 866 A1 | 11/2012 |
| EP | 2 725 617 A1 | 4/2014 |
| EP | 2 735 542 | 5/2014 |
| EP | 2 813 324 | 12/2014 |
| EP | 2 818 493 A1 | 12/2014 |
| EP | 15 153 215 | 1/2015 |
| EP | 2 831 180 | 2/2015 |
| EP | 15 157 363 | 3/2015 |
| EP | 15 164 653 | 4/2015 |
| EP | 2 884 303 A1 | 6/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 008 421 | 4/2016 |
| EP | 3 008 757 | 4/2016 |
| EP | 3 036 503 | 6/2016 |
| GB | 2 432 723 | 5/2007 |
| JP | S59-50579 | 3/1984 |
| JP | 61-89501 | 5/1986 |
| JP | S61-135280 | 6/1986 |
| JP | 61-186804 | 8/1986 |
| JP | 61-245579 | 10/1986 |
| JP | H02-170004 | 6/1990 |
| JP | 04-240817 | 8/1992 |
| JP | 5-48833 A | 2/1993 |
| JP | 05-240640 | 9/1993 |
| JP | 8-159714 | 6/1996 |
| JP | 8-292586 A | 11/1996 |
| JP | 10-26513 A | 1/1998 |
| JP | 10-221064 | 8/1998 |
| JP | H11-230860 | 8/1999 |
| JP | 11-257917 | 9/1999 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-241340 A | 9/2005 |
| JP | 2006-514366 | 4/2006 |
| JP | 2007-521559 | 8/2007 |
| JP | 2007-530978 | 11/2007 |
| JP | 2008-522418 | 6/2008 |
| JP | 2010-081002 | 4/2010 |
| JP | 2010-218770 | 9/2010 |
| JP | 2010-531520 | 9/2010 |
| JP | 2011-503673 | 1/2011 |
| JP | 2011-027707 | 2/2011 |
| JP | 2012-519584 | 8/2012 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | 99-09603 | 2/1999 |
| WO | WO 01/29576 A1 | 4/2001 |
| WO | WO 02/076988 | 10/2002 |
| WO | WO 02/101838 A1 | 12/2002 |
| WO | 03/012371 A1 | 2/2003 |
| WO | WO 03/098617 | 11/2003 |
| WO | WO 2004/072909 | 8/2004 |
| WO | WO 2004/114112 A1 | 12/2004 |
| WO | WO 2005/106965 A1 | 11/2005 |
| WO | WO 2007/006717 | 1/2007 |
| WO | WO 2007/054470 A1 | 5/2007 |
| WO | WO 2008/122531 | 10/2008 |
| WO | WO 2008/145172 | 12/2008 |
| WO | WO 2009/013282 A1 | 1/2009 |
| WO | WO 2009/021859 | 2/2009 |
| WO | WO 2009/053291 A1 | 4/2009 |
| WO | WO 2009/058115 A1 | 5/2009 |
| WO | WO 2009/105801 | 9/2009 |
| WO | WO 2010/088032 A2 | 8/2010 |
| WO | WO 2010/094636 A1 | 8/2010 |
| WO | WO 2010/118409 | 10/2010 |
| WO | WO 2010/118450 | 10/2010 |
| WO | WO 2011/067192 A2 | 6/2011 |
| WO | WO 2011/083722 | 7/2011 |
| WO | WO 2011/091967 A2 | 8/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/085803 A1 | 6/2012 |
| WO | WO 2012/110924 A1 | 8/2012 |
| WO | WO 2012/115593 | 8/2012 |
| WO | WO-2012110924 A1 * | 8/2012 | ........... H01L 51/422 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/090960 | 6/2013 |
| WO | WO 2013/091016 A1 | 6/2013 |
| WO | 2013/118037 A1 | 8/2013 |
| WO | WO 2013/116883 | 8/2013 |
| WO | WO 2013/144177 A1 | 10/2013 |
| WO | WO 2013/156101 A1 | 10/2013 |
| WO | 2013/170982 A1 | 11/2013 |
| WO | 2014/086722 A1 | 6/2014 |
| WO | 2014/097489 A1 | 6/2014 |
| WO | WO 2014/097181 A1 | 6/2014 |
| WO | WO 2014/123522 | 8/2014 |
| WO | 2014/178923 A2 | 11/2014 |
| WO | 2014/198623 A1 | 12/2014 |
| WO | 2014/198625 A1 | 12/2014 |
| WO | 2014/198626 A1 | 12/2014 |
| WO | 2014/198629 A1 | 12/2014 |
| WO | WO 2015/024871 | 2/2015 |
| WO | WO 2015/081362 | 6/2015 |
| WO | WO 2015/091607 | 6/2015 |
| WO | WO 2015/159192 | 10/2015 |
| WO | WO 2015/161989 | 10/2015 |
| WO | WO 2015/162528 | 10/2015 |
| WO | WO 2015/177784 A2 | 11/2015 |
| WO | 2015/193804 A2 | 12/2015 |
| WO | 2016/005893 A1 | 1/2016 |
| WO | 2016/092454 A1 | 6/2016 |
| WO | WO 2016/083914 | 6/2016 |
| WO | WO-2016092454 A1 * | 6/2016 | ................ G01J 1/44 |

(56) References Cited

FOREIGN PATENT DOCUMENTS

| WO | WO 2016/120392 | 8/2016 |
|---|---|---|
| WO | WO 2016/146725 | 9/2016 |

OTHER PUBLICATIONS

Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.
Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.
Ping-Hsin Huang, et al., "Synthesis and Characterization of new fluorescent two-photon absorption chromophores", J. Mater. Chem., vol. 16, 2006, pp. 850-857.
Qinglan Huang, et al., "Molecularly 'Engineered' Anode Adsorbates for Probing OLED Interfacial Structure—Charge Injection/Luminance Relationships: Large, Structure-Dependent Effects", J. Am. Chem. Soc., vol. 125, 2003, pp. 14704-14705.
A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.
G. R. A. Kumara, et al., "Fabrication of Dye-Sensitized Solar Cells Using Triethylamine Hydrothiocyanate as a CuI Crystal Growth Inhibitor", Langmuir, vol. 18, 2002, pp. 10493-10495.
Lukas Schmidt-Mende, et al., "Organic Dye for Highly Efficient Solid-State Dye-Sensitized Solar Cells", Adv. Mater., vol. 17, No. 7, 2005, pp. 813-815.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24, 1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.
Bin Peng, et al., "Systematic investigation of the role of compact $TiO_2$ solar cells", Coordination Chemistry Reviews, vol. 248, 2004, pp. 1479-1489.
Jiun Yi Shen, et al., "High $T_g$ blue emitting materials for electroluminescent devices", J. Mater. Chem., vol. 15, 2005, pp. 2455-2463.
Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
U. Bach, et al., "Solid-state dye-sensitized mesoporous $TiO_2$ solar cells with high photon-to-electron conversion efficiencies", Nature, vol. 395, 1998, pp. 583-585.
John P. Wolfe, et al., "Rational Development of Practical Catalysts for Aromatic Carbon-Nitrogen Bond Formation", Acc. Chem. Res. vol. 31, 1998, pp. 805-818.

Bryant H. Yang, et al., "Palladium-Catalyzed amination of aryl halides and sulfonates", Journal of Organometallic Chemistry, vol. 576, 1999, pp. 125-146.
Zhong Hui Li, et al., "Synthesis and Functional Properties of Strongly Luminescent Diphenylamino End-Capped Oligophenylenes", J. Org. Chem., vol. 69, 2004, pp. 921-927.
Brian O'Regan, et al., "A low-cost, high-efficiency solar cell based on dye-sensitized colloidal $TiO_2$ films", Letters to Nature, vol. 353, 1991, pp. 737-740.
International Search Report dated Sep. 24, 2014 in PCT/EP2014/061682.
International Preliminary Report on Patentability and Written Opinion dated Dec. 15, 2015 in PCT/EP2014/061682.
International Preliminary Report on Patentability and Written Opinion dated Dec. 23, 2015 in PCT/EP2014/061695.
International Search Report and Written Opinion dated May 31, 2012 in PCT/IB2012/050592 filed on Feb. 9, 2012.
Supplementary European Search Report dated Nov. 19, 2014, issued in corresponding European Patent Application No. EP 12 74 6808.
Volker Viereck, et al., Large-area applications of optical MEMS: micromirror arrays guide daylight, optimize indoor illumination, Optical Components, Photonik International 2, 2009, pp. 48-49.
C.U. Murade, et al., "High speed adaptive liquid microlens array", Optics Express, vol. 20, No. 16, Jul. 30, 2012, pp. 18180-18187..
Jason Heikenfeld, et al., "Recent Progress in Arrayed Electrowetting Optics", Optics & Photonics News, vol. 20, No. 1, Jan. 1, 2009, pp. 20-26.
Tao Peng, "Algorithms and models for 3-D shape measurement using digital fringe projections", Dissertation, University of Maryland (College Park, Md.), Jan. 16, 2007, 268 pages (http://drum.lib.umd.edu//handle/1903/6654; http://en.wikipedia.org/wiki/Gray_code; http://en.wikipedia.org/wiki/Structured-light_3D_scanner).
Jie-Ci Yang et al., "An Intelligent Automated Door Control System Based on a Smart", Sensors, 2013, 13(5), pp. 5923-5936; doi: 10.3390/s130505923 www.mdpi.com/journal/sensors.
Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462 www.acsnano.org.
International Search Report and Written Opinion dated Oct. 31, 2014 in PCT/EP2014/067466 filed Aug. 15, 2014.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.
Jack T. Billings, "An Improved Method for Critical Focus of Motion-Picture Optical Printers" Journal of the SMPTE, vol. 80, Aug. 1971, pp. 624-628.
International Search Report dated Sep. 9, 2014 in PCT/EP2014/061688 filed Jun. 5, 2014.
Written Opinion of the International Searching Authority dated Sep. 9, 2014 in PCT/EP2014/061688 filed Jun. 5, 2014.
International Search Report and Written Opinion of the International Searching Authority dated Mar. 12, 2015 in PCT/EP2014/078155 Filed Dec. 17, 2014.
International Search Report and Written Opinion of the International Searching Authority dated May 16, 2014 in PCT/IB32013/061095.
Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.
Atte Haapalinna, et al., "Measurement of the Absolute Linearity of Photodetectors with a Diode Laser," Meas. Sci. Technol., 10, (1999) 1075-1078.
M. R. Andersen, et al., "Kinect Depth Sensor Evaluation for Computer Vision Applications",Electrical and Computer Engineering, Technical Report ECE-TR-6, Aarhus University, 2012, 39 pages.
Takumi Kinoshita, et al., "Wideband dye-sensitized solar cells employing a phosphine-coordinated ruthenium sensitizer", Nature Photonics, vol. 7, 2013, pp. 535-239.

(56) References Cited

OTHER PUBLICATIONS

Office Action dated Apr. 22, 2015 in Chinese Patent Application No. 201280018328.5 (submitting English translation only).
International Search Report and Written Opinion dated Sep. 3, 2014 in PCT/EP2014/061691.
International Preliminary Report on Patentability dated Sep. 25, 2015 in PCT/EP2014/061691.
Kuthirumal, S., et al., "Flexible Depth of Field Photography," IEEE Transactions on Pattern Analysis and Machine Intelligence, vol. 33, No. 1 (2011), pp. 58-71.
Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25, 1998, pp. 953-959.
International Preliminary Report on Patentability and Written Opinion dated Dec. 23, 2015 in PCT/EP2014/061688.
Klimentjew, D. et al., "Multi Sensor Fusion of Camera and 3D Laser Range Finder for Object Recognition," 2010 IEEE International Conference on Multisensor Fusion and Integration for Intelligent Systems, University of Utah, Salt Lake City, UT, USA, Sep. 5-7, 2010, pp. 236-241.
International Search Report and Written Opinion dated Nov. 21, 2014 in PCT/EP2014/067465.
"So funktioniert die DLP-Technologie" DLP-Technologie—www.dlp.com/de/technology/how-dlp-works, 2014, 2 Pages.
"New—Ultra-Compact Pockels Cells with Brewster Polarizer and Waveplate for Laser Q-Switching" Leysop Ltd, Manufacturers and Suppliers of Electro-Optic Components—http://www.leysop.com/integrated_pockels_cell.htm, Aug. 4, 2013, 2 Pages.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, pp. 4164-4169.
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.
International Search Report dated Sep. 22, 2015, in Application No. PCT/IB2015/052785, filed on Apr. 16, 2015.
International Search Report dated Nov. 27, 2015, in PCT/IB2015/055121, filed Jul. 7, 2015.
International Search Report and Written Opinion dated Mar. 29, 2016, in PCT/IB2015/054536, filed Jun. 16, 2015.
International Search Report and Written Opinion dated Jan. 18, 2016 in PCT/IB2015/057412 filed Sep. 28, 2015.
Wang, Feng-Peng et al., "Distance Measurement using Digital Cameras Based on Laser Spot Detection", published on Jun. 30, 2011, School of Physics and Electronic Information, Gannan Normal University, Ganzhou 341000, China (with English Abstract).
Bahaa E. A. Saleh, et al., "Fundamentals of Photonics" John Wiley & Sons, Inc., Chapter 3, 1991, pp. 80-107 (with Cover Page).
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriel Levy et al., "Tunable optofluidic devices", Microfluid Nanofluid, 2008, vol. 4, pp. 97-105.
International Search Report dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.
International Preliminary Report and Written Opinion dated Mar. 10, 2016, in PCT/IB2015/059404.
International Search Report dated Mar. 22, 2016 in PCT/IB2015/059408 filed Dec. 7, 2015.
International Search Report and Written Opinion dated May 27, 2016, in PCT/EP2016/051817, filed Jan. 28, 2016.
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.
Antonio Facchetti, "Polymer donor-polymer acceptor (all-polymer) solar Cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.
Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L.Thomas, "Phthalocyanine Research and Applications", CRC Press, 1990, pp. 253-271 with cover pages.
International Search Report and Written Opinion dated Jul. 19, 2016 in PCT/EP2016/058487 filed Apr. 18, 2016.
International Preliminary Report on Patentability and Written Opinion dated Feb. 1, 2018, in PCT/EP2016/066783.
http://www.plenoptic.info/pages/refocusing.html.
C. Hahne, A. Aggoun, S. Haxha, V. Velisavljevic, and J. Fernández, "Light field geometry of a standard plenoptic camera," Opt. Express 22, 26659-26673 (2014).
C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.
C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photography X, 902305 (Mar. 7, 2014).
Baeg et al., "Organic Light Detectors: Photodiodes and Phototransistors", *Advanced Materials*, vol. 25, No. 31, Mar. 11, 2013, pp. 4267-4295.
Office Action dated Jan. 3, 2018, in Chinese Patent Application No. 201610552144.7 parallel to U.S. Appl. No. 15/364,680.
International Preliminary Report on Patentability and Written Opinion dated Feb. 22, 2018 in PCT/EP2016/069049).

(56) References Cited

OTHER PUBLICATIONS

R. M. Schaffert, "A New High-Sensitivity Organic Photoconductor for Electrophotography", *IBM J. Res. Develop.*, 1971, p. 75-89.

P. Gregory, Ed., Chemistry and Technology of printing and imaging systems, Chapman & Hall, 1996, Chap. 4, R.S. Gairns, *Electrophotography*, p. 76-112.

Benjamin F. Grewe, et al., "Fast Two-Layer Two-Photon Imaging of Neuronal Cell Populations Using an Electrically Tunable Lens," *Biomedical Optics Express*, vol. 2, No. 7, Jul. 1, 2011 (pp. 2035-2046).

Petr Bartu et al, "Conformable Large-AreaPposition-Sensitive Photodetectors Based on Luminescence-Collecting Silicone Waveguides," *Journal of Applied Physics*, 107, 123101 (2010).

Roland Stolarski, "Fluorescent Naphthalimide Dyes for Polyester Fibres," *Fibres & Textiles* in Eastern Europe, vol. 17, No. 2 (73) pp. 91-95 (2009).

Ayse Aktas et al., "Synthesis, Characterization, Electrochemical and Spectroelectrochemical Properties of Peripherally Tetra-Substituted Metal-Free and Metallophthalocyanines," *Dyes and Pigments*, 99, (2013) 613-619.

Hairong Li, et al., "Syntheses and Properties of Octa-, Tetra-, and Di-Hydroxy-Substituted Phthalocyanines," *Tetrahedron*, 65 (2009) 3357-3363.

"Methine Dyes and Pigments," *Ullmann's Encyclopedia of Industrial Chemistry*, vol. 23 (2012).

Jing Liu, et al., "Sulfone-Rhodamines: A New Class of Near-Infrared Fluorescent Dyes for Bioimagin," *ACS Applied Materials& Interfaces*, 8, 22953-22962 (2016).

E. Noelting et al., "Berichte der deutschen chemischen Gesellschaft", *Band*, 38, S. 3516-3527 (1905).

T. Nedelcev et al., "Preparation and Characterization of a New Derivative of Rhodamine B with an Alkoxysilane Moiety," *Dyes and Pigments*, 76 (2008), 550-556.

Aurore Loudet et al., "BODIPY Dyes and Their Derivatives: Syntheses and Spectroscopic Properties," *Chem. Rev.*, 107 (2007) 4981-4932.

Weili Zhao, et al., "Conformationally Restricted Aza-Bodipy: A Highly fluorescent, Stable, Near-Infrared-Absorbing Dye", *Angew. Chem. Int. Ed.*, 44 (2005) 1677-1679.

Georg M. Fischer, et al., "Near-Infrared Dyes and Fluorophores Based on Diketopyrrolopyrroles," *Angew. Chem. Int. Ed.* 46 (2007) 3750-3753.

Amaresh Mishra et al., "Small Molecule Organic Semiconductors on the Move: Promises for Future Solar Energy Technology," *Angew. Chem. Int. Ed.*, 51, (2012), 2020-2067.

G. Seybold et al., "New Perylene and Violanthrone Dyestuffs for Fluorescent Collectors," *Dyes and Pigments*, 11 (1989) 303-317.

Nam-Trung Nguyen, "Micro-Optofluidic Lenses: A Review", *Biomicrofluidics*, 4, (2010) 031501.

Uriel Levy et al., "Tunable Optofluidic Devices," *Microfluid Nanofluid* (2008) 4: 97-105.

Robert Koeppe et al., "Video-Speed Detection of the Absolute Position of a Light Point on a Large-Area Photodetector Based on Luminescent Waveguides," *Optics Express*, vol. 18, No. 3, (Feb. 1, 2010), 2209.

Office Action dated Jul. 9, 2018, in Japanese Patent Application No. 2017-007544.

Xing Lin, et al., "Coded focal stack photography", Computational Photography (ICCP), 2013 IEEE International Conference On, Apr. 19, 2013, XP032424246, pp. 1-9.

Nabeel A. Riza, et al., "Noncontact distance sensor using spatial signal processing", Optics Letters, Optical Society of America, vol. 34, No. 4, Feb. 15, 2009, XP001522006, pp. 434-436.

Nabeel A. Riza, et al., "Smart agile lens remote optical sensor for three-dimensional object shape measurements", Applied Optics, Optical Society of America, vol. 49, No. 7, Mar. 1, 2010, XP001552714, pp. 1139-1150.

International Search Report dated Nov. 7, 2017, in corresponding PCT/EP2017/057867.

International Search Report dated Jul. 7, 2017, in corresponding PCT/EP2017/057825.

Street (Ed.): Technology and Applications of Amorphous Silicon, Springer-Verlag Heidelberg, 2010, pp. 346-349.

International Search Report dated Aug. 17, 2017, in corresponding PCT/EP2017/060057.

International Search Report dated Aug. 1, 2017, in corresponding PCT/EP2017/060058.

Walter Fuhs, "Hydrogenated Amorphous Silicon—Material Properties and Device Applications", in S. Baranovski, Charge Transport in Disordered Solids, Wiley, p. 97-147, 2006.

A.G. Pattantyus-Abraham, I.J. Kramer, A.R. Barkhouse, X. Wang, G. Konstantatos, R. Debnath, L. Levina, I. Raabe, M.K. Nazeeruddin, M. Grätzel, and E.H. Sargent, *Depleted-Heterojunction Colloidal Quantum Dot Solar Cells*, ACS NANO 4 (6), May 24, 2010.

R. Martins and E. Fortunato, Thin Film Position Sensitive Detectors: from 1D to 3D Applications, Chap. 8 in R. A. Street (Ed.), *Technology and Applications of Amorphous Silicon*, Springer, 2010.

International Search Report dated Oct. 20, 2017 in PCT/EP2017/068956 filed on Jul. 27, 2017.

Leskela, M. et al., "Preparation of lead sulfide thin films by the atomic layer epitaxy process," Pergamon Press plc, Vacuum/vol. 41/Nos. 4-6, pp. 1457-1459 (1990).

Dasgupta, N. et al., "Fabrication and Characterization of Lead Sulfide Thin Films by Atomic Layer Deposition," The Electrochemical Society, ECS Transactions, 16 (4) 29-36 (2008), Total 8 pages.

Dasgupta, N. et al., "Design of an atomic layer deposition reactor for hydrogen sulfide compatibility," Review of Scientific Instruments 81, 044102 (2010), Total 6 pages.

Xu, J. et al., "Atomic layer deposition of absorbing thin films on nanostructured electrodes for short-wavelength infrared photosensing," AIP Publishing, Applied Physics Letters 107, 153105 (2015), Total 5 pages.

Blount, G., et al., "Photoconductive properties of chemically deposited PbS with dielectric overcoatings," AIP Publishing, Journal of Applied Physics 46, 3489 (1975), Total 12 pages.

Groner, M. et al., "Low-Temperature Al2O3 Atomic Layer Deposition," American Chemical Society, Chem. Mater., vol. 16, No. 4, 2004, pp. 639-645.

Yoon, W. et al., "Electrical Measurement Under Atmospheric Conditions of PbSe Nanocrystal Thin Films Passivated by Remote Plasma Atomic Layer Deposition of Al2O3," IEEE Transactions on Nanotechnology, vol. 12, No. 2, Mar. 2013, pp. 146-151.

Hu, C., et al., "Air-stable short-wave infrared PbS colloidal quantum dot photoconductors passivated with Al2O3 atomic layer deposition," AIP Publishing, Applied Physics Letters 105, 171110 (2014), Total 5 pages.

Liu, Y., et al., "Robust, Functional Nanocrystal Solids by Infilling with Atomic Layer Deposition," ACS Publications, American Chemical Society, Nano Letters 2011, 11, pp. 5349-5355.

Liu, Y., et al., "PbSe Quantum Dot Field-Effect Transistors with Air-Stable Electron Mobilities above 7 cm$^2$ V$^{-1}$ s$^{-1}$ ," ACS Publications, American Chemical Society, Nano Letters 2013, 13, pp. 1578-1587.

George, S., "Atomic Layer Deposition: An Overview," American Chemical Society, Chem. Rev. 2010, 110, pp. 111-131.

Konstantatos, G., et al., "Engineering the Temporal Response of Photoconductive Photodetectors via Selective Introduction of Surface Trap States," American Chemical Society, Nano Letters 2008, vol. 8, No. 5, pp. 1446-1450.

Soci, C., et al., "ZnO Nanowire UV Photodetectors with High Internal Gain," American Chemical Society, Nano Letters 2007, vol. 7, No. 4, pp. 1003-1009.

List of integrated circuit packaging types (Wikipedia article, downloaded Jan. 15, 2019 from https://en.wikipedia.org/wiki/List_of_integrated_circuit_packaging_types).

List of integrated circuit packaging types, Dimension Reference (Wikipedia article, downloaded Jan. 15, 2019 from https://en.wikipedia.org/wiki/List_of integrated_circuit_packaging_types#PIN-PITCH).

*Wikipedia*, Article denoted, "Thermocouple", retrieved Jul. 20, 2016. (Cited in U.S. Pat. No. 519,226 Feb. 25, 2019)

(56) References Cited

OTHER PUBLICATIONS

Chinese Office Action dated Jan. 29, 2019, in Chinese Patent Application No. 201580036919.9.
Pekkola et al., "Focus-Induced Photoresponse: a novel way to measure distances with photodetectors", *Scientific Reports* (2018) 8:9208, 8 pages.
L. Pintilie, et al., "Field-effect-assisted photoconductivity in PbS films deposited on silicon dioxide", *J. Appl. Phys.* 91, p. 5782, 2002.
Kurt Konolige et al., "A Low-Cost Laser Distance Sensor", *2008 IEEE International Conference on Robotics and Automation*, Pasadena, CA, May 19-23, 2008.
International Preliminary Report on Patentability and Written Opinion dated Aug. 22, 2019 in PCT/EP2018/053057.
J. Robertson, "High Dielectric Constant Oxides", *European Physical Journal Applied Physics*, vol. 28, No. 3, pp. 265-291, 2004.
J.A. Kittl et al., "High-k Dielectrics for Future Generation Memory Devices", *Microelectronic Engineering*, Vo. 86 (2009) 1789-1795.
Serap Günes, et al., "Hybrid Solar Cells", *Inorganica Chimica Acta* 361, (2008), p. 581-588.
John E. Anthony, et al., "n-Type Organic Semiconductors in Organic Electronics", *Adv. Mater.* 2010, 22, pp. 3876-3892.
Tian-yi Li, et al., "Small Molecule Near-Infrared Boron Dipyrromethene Donors for Organic Tandem Solar Cells", *J. Am. Chem. Soc.* 2017, 139, 13636-13639.
Christian Ulrich et al., "Organic Thin-Film Photovoltaic Cells Based on Oligothiophenes with Reduced Bandgap", *Adv. Funct. Mater.* 2007, 17, pp. 2991-2999.
Ronald Gresser, et al., "Synthesis and Characterization of Near-Infrared Absorbing Benzannulated Aza-BODIPY Dyes", *Chem. Eur. J.* 2011, 17, pp. 2939-2947.
Amaresh Mishra, et al., "Small Molecule Organic Semiconductors on the Move: Promises for Future Solar Energy Technology", *Angew. Chem. Int. Ed.* 2012, 51, 2020-2067.
Huifeng Yao, et al., "Molecular Design of Benzodithiophene-Based Organic Photovoltaic Materials", *Chem. Rev.* 2016, 116, 7397-7457.
Moritz Riede, et al., "Efficient Organic Tandem Solar Cells based on Small Molecules", *Adv. Funct. Mater.* 2011, 21, pp. 3019-3028.
Rico Schueppel, et al., "Controlled Current Matching in Small Molecule Organic Tandem Solar Cells Using Doped Spacer Layers", *J. Appl. Phys.* 107, 044503, 2010.
Jan Meiss et al., "Fluorinated Zinc Phthalocyanine as Donor for Efficient Vacuum-Deposited Organic Solar Cells," *Adv. Funct. Mater.* 2012, 22, pp. 405-414.
Japanese Office Action dated Nov. 5, 2019, in corresponding Japanese Patent Application No. 2017-558775 w/English translation.
Wikipedia—Printed Circuit Board: https://en.wikipedia.org/wiki/Printed_circuit_board ( 25 pages).
ISO 21348 Definitions of Solar Irradiance Spectral Categories, http://SpaceWx.com.
U.S. Appl. No. 15/514,830, filed Mar. 28, 2017, U.S. Pat. No. 10,094,927, Send, et al.
U.S. Appl. No. 15/534,041, filed Jun. 8, 2017, US 2017-0363741, Send, et al.
U.S. Appl. No. 15/547,664, filed Jul. 31, 2017, US 2018-0017679, Valouch, et al.
U.S. Appl. No. 15/744,334, filed Jan. 12, 2018, US 2018-0210064, Send, et al.
U.S. Appl. No. 15/751,283, filed Feb. 8, 2018, US 2018-0231376, Send, et al.
U.S. Appl. No. 15/758,135, filed Mar. 7, 2018, U.S. Pat. No. 10,412,283, Send, et al.
U.S. Appl. No. 15/775,424, filed May 11, 2018, US 2018-0329024, Send, et al.
U.S. Appl. No. 15/778,454, filed May 23, 2018, US 2018-0356501, Send, et al.
U.S. Appl. No. 16/090,990, filed Oct. 3, 2018, US 2019-0140129, Valouch, et al.
U.S. Appl. No. 16/091,409, filed Oct. 4, 2018, US 2019-0157470, Send, et al.
U.S. Appl. No. 16/094,402, filed Oct. 17, 2018, US 2019-0129036, Valouch, et al.
U.S. Appl. No. 16/095,846, filed Oct. 23, 2018, Valouch, et al.
U.S. Appl. No. 16/096,361, filed Oct. 25, 2018, US 2019-0129035, Valouch, et al.
U.S. Appl. No. 16/321,143, filed Jan. 28, 2019, US 2019-0172964, Hermes, et al.
U.S. Appl. No. 16/321,054, filed Jan. 28, 2019, US 2019-0170849, Hermes, et al.
U.S. Appl. No. 16/344,538, filed Apr. 24, 2019, US 2019-0277703, Valouch, et al.
U.S. Appl. No. 16/347,364, filed May 3, 2019, Eberspach, et al.
U.S. Appl. No. 16/344,511, filed Apr. 24, 2019, Valouch, et al.
U.S. Appl. No. 16/461,654, filed May 16, 2019, Schildknecht, et al.
U.S. Appl. No. 16/461,670, filed May 16, 2019, Eberspach, et al.
U.S. Appl. No. 16/484,369, filed Aug. 7, 2019, Lungenschmied, et al.
U.S. Appl. No. 16/478,907, filed Jul. 18, 2019, Valouch, et al.
U.S. Appl. No. 16/483,231, filed Aug. 2, 2019, Send, et al.
U.S. Appl. No. 16/500,113, filed Oct. 2, 2019, Altenbeck, et al.

\* cited by examiner

A

B

DETECTOR FOR DETERMINING A POSITION OF AT LEAST ONE OBJECT

FIELD OF THE INVENTION

The invention relates to a method for adjusting a detector for determining a position of at least one object within a range of measurement and a detector for determining a position of at least one object. The invention further relates to a detector system, a human-machine interface for exchanging at least one item of information between a user and a machine, an entertainment device, a tracking system, and a camera. The devices and methods according to the present invention specifically may be employed, for example in various areas of daily life, gaming, traffic technology, production technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible. Further, the invention specifically can be used for determining a focus length of at least one transfer device.

PRIOR ART

A large number of detectors configured to determine a position of an object are known from the prior art. Such detectors for determining the position of the object are known on the basis of optical sensors and photovoltaic devices.

Optical detectors which can be based generally on the use of inorganic and/or organic sensor materials are known from the prior art. Examples of such detectors are disclosed in US 2007/0176165 A1, U.S. Pat. No. 6,995,445 B2, DE 2501124 A1, DE 3225372 A1 or else in numerous other prior art documents. To an increasing extent, in particular for cost reasons and for reasons of large-area processing, detectors comprising at least one organic sensor material are being used, as described for example in US 2007/0176165 A1.

Further, generally, for various other detector concepts, reference may be made to WO 2014/097181 A1, WO 2014/198626 A1, WO 2014/198629 A1, WO 2014/198625 A1, and WO 2015/024871 A1, the full content of which is herewith included by reference. Further, referring to potential materials and optical detectors which may also be employed in the context of the present invention, reference may be made to WO 2016/120392 A1, WO 2016/169871 A1, WO 2017/012986 A1, WO 2017/025567 and European patent applications EP 15180353.3, filed on Aug. 10, 2015, and EP 15 185 005.4, filed on Sep. 14, 2015, EP 15 196 238.8 and EP 15 196 239.6, both filed on Nov. 25, 2015, EP 15 197 40 744.4, filed on Dec. 3, 2015, the full content of all of which is herewith also included by reference.

Furthermore, WO 2016/005893 A1 describes a detector for determining a position of at least one object. The detector comprising: at least one transfer device for imaging the object into an image plane, the transfer device having a focal plane; at least one longitudinal optical sensor, wherein the longitudinal optical sensor has at least one sensor region, wherein the longitudinal optical sensor is at least partially transparent, wherein the longitudinal optical sensor is designed to generate at least one longitudinal sensor signal in a manner dependent on an illumination of sensor region by at least one light beam propagating from the object to the detector, wherein the longitudinal sensor signal, given the same total power of the illumination, is dependent on a beam cross-section of the light beam in the sensor region; and at least one evaluation device, wherein the evaluation device is designed to generate at least one item of information on a longitudinal position of the object by evaluating the longitudinal sensor signal. Herein the at least one longitudinal optical sensor comprises a focal longitudinal optical sensor, wherein the focal longitudinal optical sensor at least substantially is arranged in the focal plane.

WO 2016/092454 A1 describes an optical detector comprising: at least one optical sensor adapted to detect a light beam and to generate at least one sensor signal, wherein the optical sensor has at least one sensor region, wherein the sensor signal of the optical sensor exhibits a non-linear dependency on an illumination of the sensor region by the light beam with respect to a total power of the illumination; at least one image sensor being a pixelated sensor comprising a pixel matrix of image pixels, wherein the image pixels are adapted to detect the light beam and to generate at least one image signal, wherein the image signal exhibits a linear dependency on the illumination of the image pixels by the light beam with respect to the total power of the illumination; and at least one evaluation device, the evaluation device being adapted to evaluate the sensor signal and the image signal. In a particularly preferred embodiment, the non-linear dependency of the sensor signal on the total power of the illumination of the optical sensor is expressible by a non-linear function comprising a linear part and a non-linear part, wherein the evaluation device is adapted to determine the linear part and/or the non-linear part of the non-linear function by evaluating both the sensor signal and the image signal. Herein, the evaluation device, preferably, comprises a processing circuit being adapted to provide a difference between the sensor signal and the image signal for determining the non-linear part of the non-linear function.

WO 2016/092450 A1 describes a detector for an optical detection of at least one object. The detector comprises:—at least one transfer device, wherein the transfer device comprises at least two different focal lengths in response to at least one incident light beam;—at least two longitudinal optical sensors, wherein each longitudinal optical sensor has at least one sensor region, wherein each longitudinal optical sensor is designed to generate at least one longitudinal sensor signal in a manner dependent on an illumination of the sensor region by the light beam, wherein the longitudinal sensor signal, given the same total power of the illumination, is dependent on a beam cross-section of the light beam in the sensor region, wherein each longitudinal optical sensor exhibits a spectral sensitivity in response to the light beam in a manner that two different longitudinal optical sensors differ with regard to their spectral sensitivity; wherein each optical longitudinal sensor is located at a focal point of the transfer device related to the spectral sensitivity of the respective longitudinal optical sensor; and—at least one evaluation device, wherein the evaluation device is designed to generate at least one item of information on a longitudinal position and/or at least one item of information on a color of the object by evaluating the longitudinal sensor signal of each longitudinal optical sensor. Thereby, a simple and, still, efficient detector for an accurate determining of a position and/or a color of at least one object in space is provided.

However, the longitudinal optical sensors need to be positioned in such a way in the optical path way that optimum measurement results, in particular in view of resolution and dynamic range, is possible.

Problem Addressed by the Invention

Therefore, a problem addressed by the present invention is that of specifying devices for determining a position of at least one object and a method for adjusting a detector for determining a position of at least one object within a range of measurement which at least substantially avoid the disadvantages of known devices and methods of this type. In particular, the proposed devices and methods are intended to make it possible to determine the position of the at least one object with a high degree of resolution, at a low technical effort.

DISCLOSURE OF THE INVENTION

This problem is solved by a method, a detector, a detector system, a human-machine-interface, a tracking system and a camera with the features of the independent patent claims. Preferred embodiments which might be realized in an isolated fashion or in arbitrary combination are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the invention, a method for adjusting a detector for determining a position of at least one object within a range of measurement is proposed. The method comprises the following steps, which may be performed in the given order or in a different order. Further, two or more or even all of the method steps may be performed simultaneously and/or overlapping in time. Further, one, two or more or even all of the method steps may be performed repeatedly. The method may further comprise additional method steps.

The method may be performed during or after manufacturing of the detector and/or before a measurement of the longitudinal coordinate of the object is performed.

The detector comprises at least two longitudinal optical sensors and at least one transfer device for imaging the object into an image plane. The transfer device has a focal plane. The transfer device is positioned in between the longitudinal optical sensors and the object. Each of the longitudinal optical sensors has at least one sensor region. Each of the longitudinal optical sensors is designed to generate at least one longitudinal sensor signal in a manner dependent on an illumination of the respective sensor region by at least one light beam propagating from the object to the detector. The longitudinal sensor signal, given the same total power of the illumination, is dependent on a beam cross-section of the light beam in the sensor region. The detector further comprises at least one evaluation device.

The method comprises the following steps:

(i) subsequently moving the object longitudinally to at least two different calibration positions having at least two different longitudinal coordinates within the range of measurement;

(ii) recording, for each of the calibration positions, at least one first longitudinal sensor signal generated by a first longitudinal optical sensor and at least one second longitudinal sensor signal generated by a second longitudinal optical sensor;

(iii) forming, for each of the calibration positions, at least one calibration signal using the first and second longitudinal sensor signals;

(iv) generating a calibration function using the calibration signals, the calibration function defining a relationship between the longitudinal coordinate of the object and the first and second longitudinal sensor signals.

As used herein, a detector generally refers to a device which is capable of generating at least one detector signal and/or at least one image, in response to an illumination by one or more illumination sources and/or in response to optical properties of a surrounding of the detector.

Thus, the detector may be an arbitrary device adapted for performing at least one of an optical measurement and imaging process. Specifically, the detector is adapted for determining a position of at least one object.

As used herein, the term position generally refers to at least one item of information regarding a location and/or orientation of the object and/or at least one part of the object in space. The at least one item of information may imply at least one distance between at least one point of the object and the at least one detector. As will be outlined in further detail below, the distance may be a longitudinal coordinate or may contribute to determine a longitudinal coordinate of the point of the object. Additionally or alternatively, one or more other items of information regarding the location and/or orientation of the object and/or at least one part of the object may be determined. As an example, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space. The position may relate to the entire object or else only a part, for example a point, an area or a region of the object. Said part can be arranged on a surface of the object or else at least partly within the object.

For this purpose, as an example, one or more coordinate systems may be used, and the position of the object may be determined by using one, two, three or more coordinates. As an example, one or more Cartesian coordinate systems and/or other types of coordinate systems may be used. In one example, the coordinate system may be a coordinate system of the detector in which the detector has a predetermined position and/or orientation. As will be outlined in further detail below, the detector may have an optical axis, which may constitute a main direction of view of the detector. The optical axis may form an axis of the coordinate system, such as a z-axis. Further, one or more additional axes may be provided, preferably perpendicular to the z-axis.

Thus, as an example, the detector may constitute a coordinate system in which the optical axis forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The object generally may be an arbitrary object. In one embodiment, the object may be a rigid object. Other embodiments are feasible, such as embodiments in which the object is a non-rigid object or an object which may change its shape. The object can be detected completely or partly by means of the detector. The object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

The detector comprises the at least one transfer device for imaging the object into an image plane. As used herein, a transfer device generally is a device, specifically an optical device, having one or both of a focusing or a defocusing effect onto light originating from the at least one object, for example light from the at least one object due to illumination by one or more illumination sources and/or in response to optical properties of a surrounding of the object. The optical device may comprise at least one element selected from the group consisting of: a lens, in particular a focusing and/or a defocusing lens; a focusing mirror; a defocusing mirror. The at least one transfer device may fully or partially be positioned in a beam path between the longitudinal optical sensor and the object and may be adapted such that the light beam traveling from the object to the detector passes through the transfer device. As used herein, the term "beam path" refers to the path on which the light beam travels or propagates.

Further, as used herein, an image plane generally is a plane, which is preferably situated perpendicular to an optical axis of the transfer device and/or the longitudinal optical sensor, on which the object is imaged by the transfer device. Thus, the image plane comprises the image of the object. The optical axis may be parallel to the z-axis and/or parallel to the main direction of view of the detector. Strictly speaking, this definition only holds true for two-dimensional objects without an expansion in a dimension of an object distance. With respect to 3-dimensional objects, an image plane generally is a plane perpendicular to an optical axis of the transfer device and/or the longitudinal optical sensor, on which at least one point of the object, in particular of the surface of the object, is imaged. As used herein, "imaging the object" refers to one or more of projecting, focusing and defocusing of the object, in particular light originating from the at least one object, for example light from the at least one object due to illumination by one or more illumination sources and/or in response to optical properties of a surrounding of the object.

The transfer device has a focal plane. As used herein, the term "focal plane" refers to a plane which comprises a point where light rays, impinging the transfer device parallel to the optical axis, converge behind the transfer device. As used herein the term "focal length" refers to a property of the transfer device that objects at infinity distance from the transfer device are focused in the so called focal plane.

As used herein, the term "focused image plane" refers to a plane in which at least a part of the object placed at finite distance from transfer device may be focused. In this context, it should be carefully noted that the focal plane of the transfer device, such as of the lens or combination of lenses, does not necessarily have to be identical to the focused image plane, even though in photography the terms "focal plane" and "focused image plane" often are used as synonyms. The focal plane is the plane comprising the focal point of the transfer device, which preferably is orthogonal to the optical axis of the transfer device and/or the optical axis of the detector. Contrarily, the focused image plane is the plane in which the actual image of at least one object is created by the transfer device. In case the object is shifted towards an infinite distance from the transfer device, the focused image plane is shifted towards the focal plane.

The transfer device is positioned in between the longitudinal optical sensors and the object. For example, the transfer device may comprise at least one optical axis. The transfer device may be positioned such that light originating from the object, firstly, is transferred by the transfer device and subsequently impinges on the longitudinal optical sensors. The object, longitudinal optical sensors and the transfer device may be arranged on the optical axis such that the transfer device is positioned in between the longitudinal optical sensors and the object. However, embodiments are feasible wherein the transfer device and the longitudinal optical sensors are arranged in different beam paths.

The detector comprises at least two longitudinal optical sensors. As used herein, a longitudinal optical sensor generally is a device which is designed to generate at least one longitudinal sensor signal in a manner dependent on an illumination of the sensor region by the at least one light beam traveling from the object to the detector. The longitudinal sensor signal, given the same total power of the illumination, is dependent on a beam cross-section of the light beam in the sensor region. For potential setups of the longitudinal optical sensors, reference may be made to WO 2012/110924 A1 and/or WO2014/097181 A1 and/or WO 2016/005893 A1. Still, other embodiments are feasible.

The detector may comprise a plurality of longitudinal optical sensors. The detector may comprise a stack of longitudinal optical sensors. The first and second longitudinal optical sensors may form part of the stack of longitudinal optical sensors. The sensor stack may be composed of longitudinal optical sensors being arranged such that the sensor regions of the longitudinal optical sensors are oriented essentially perpendicular to an optical axis of the detector. The longitudinal optical sensors may be identical or may be different such that at least two different types of optical sensors may be comprised. The longitudinal optical sensors may comprise at least one of an inorganic optical sensor and an organic optical sensor. As used herein, an organic optical sensor generally refers to an optical sensor having at least one organic material included therein, preferably at least one organic photosensitive material. Further, hybrid optical sensors may be used including both inorganic and organic materials.

For potential embodiments of the longitudinal optical sensor, reference may be made to the optical sensor as disclosed in WO 2012/110924 A1 and WO 2016/005893 A1. Preferably, however, as will be outlined in further detail below, the detector according to the present invention may comprise a plurality of optical sensors, such as a plurality of optical sensors as disclosed in WO 2012/110924 A1 and WO 2016/005893 A1, preferably as a sensor stack.

Thus, as an example, the detector according to the present invention may comprise a stack of optical sensors as disclosed in WO 2012/110924 A1 and WO 2016/005893 A1.

In case the detector comprises at least one stack of optical sensors, the stack comprising at least two longitudinal optical sensors, the stack optionally may partially or fully be immersed in one or more transparent immersion matrices, such as in one or more immersion liquids, such as in one or more of: an oil; a liquid to avoid and/or decrease reflections at interfaces; a resin, a polymer. The immersion matrix generally may be adapted to avoid and/or decrease reflections at interfaces and/or may be adapted to fully or partially stabilize the stack mechanically and/or may be adapted to fully or partially protect the stack from external influences such as mechanical, chemical or environmental influences. Thus, at least one of the optical sensors of the stack may fully or partially be immersed in the at least one immersion matrix and/or may fully or partially be embedded in the at least one immersion matrix.

Preferably, the longitudinal optical sensors may comprise one or more photo detectors, preferably one or more organic photodetectors and, most preferably, one or more dye-sensitized organic solar cells (DSCs, also referred to as dye solar cells), such as one or more solid dye-sensitized organic solar cells (s-DSCs). Thus, preferably, the detector may comprise one or more DSCs (such as one or more sDSCs) acting as the longitudinal optical sensor and one or more DSCs (such as one or more sDSCs) acting as the longitudinal optical sensor, preferably a stack of a plurality of DSCs (preferably a stack of a plurality of sDSCs) acting as the longitudinal optical sensor.

Each of the longitudinal optical sensors has at least one sensor region. Preferably, the sensor region of each of the longitudinal optical sensors may be formed by one continuous sensor region, such as one continuous sensor area or sensor surface per device. Thus, preferably, each sensor region of the longitudinal optical sensors may be formed by exactly one continuous sensor region. Each of the longitudinal optical sensors may have a sensor region providing a sensitive area, also referred to as a sensor area, of at least 1 mm$^2$, preferably of at least 5 mm$^2$, such as a sensor area of 5 mm$^2$ to 1000 cm$^2$, preferably a sensor area of 7 mm$^2$ to 100 cm$^2$, more preferably a sensor area of 1 cm$^2$. The sensor area preferably has a rectangular geometry, such as a square geometry. However, other geometries and/or sensor areas are feasible.

Preferably, the longitudinal optical sensors may be thin film devices, having a layer setup of layers including electrode and photovoltaic material, the layer setup having a thickness of preferably no more than 1 mm, more preferably of at most 100 µm, at most 5 µm or even less. Thus, the sensor regions of the longitudinal optical sensors preferably may be or may comprise a sensor area, which may be formed by a surface of the respective device facing towards the object.

At least one of the longitudinal optical sensors may be at least partially transparent. Thus, generally, the longitudinal optical sensors may comprise at least one at least partially transparent optical sensor such that the light beam at least partially may pass through the longitudinal optical sensor. As used herein, the term "at least partially transparent" may both refer to the option that the entire longitudinal optical sensor is transparent or a part (such as a sensitive region) of the longitudinal optical sensor is transparent and/or to the option that the longitudinal optical sensor or at least a transparent part of the longitudinal optical sensor may transmit the light beam in an attenuated or non-attenuated fashion. Thus, as an example, the transparent longitudinal optical sensor may have a transparency of at least 10%, preferably at least 20%, at least 40%, at least 50% or at least 70%. In order to provide a sensory effect, generally, the longitudinal optical sensor typically has to provide some sort of interaction between the light beam and the longitudinal optical sensor which typically results in a loss of transparency. The transparency of the longitudinal optical sensor may be dependent on a wavelength of the light beam, resulting in a spectral profile of a sensitivity, an absorption or a transparency of the longitudinal optical sensor. Preferably all longitudinal optical sensors of the plurality and/or the stack are transparent.

The longitudinal optical sensors may have different spectral properties. Thus, one of the longitudinal optical sensors may provide a strong absorption (such as absorption peak) in the red spectral region, another one of the longitudinal optical sensors may provide a strong absorption in the green spectral region, and another one may provide a strong absorption in the blue spectral region. Other embodiments are feasible. As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Further, the spectral range of 600 nm to 780 nm may be defined as the red spectral range, the range of 490 nm to 600 nm as the green spectral range, and the range of 380 nm to 490 nm as the blue spectral range.

The longitudinal sensor signals, in particular the first longitudinal sensor signal and second longitudinal sensor signal, preferably may be selected from the group consisting of a current (such as a photocurrent) and a voltage (such as a photovoltage). Further, the longitudinal sensor signals may be preprocessed, in order to derive refined sensor signals from raw sensor signals, such as by averaging and/or filtering. The longitudinal sensor signals may, additionally or alternatively, depend on other properties of the light beam such as a width of the light beam. The longitudinal sensor signals preferably may be an electrical signal, such as an electrical current and/or an electric voltage. The longitudinal sensor signals may be a continuous or discontinuous signal. Further, the longitudinal sensor signals may be an analogue signal or a digital signal. Further, the longitudinal optical sensors, by itself and/or in conjunction with other components of the longitudinal optical sensors, may be adapted to process or preprocess the longitudinal sensor signal, such as by filtering and/or averaging, in order to provide a processed longitudinal sensor signal. Thus, as an example, a bandpass filter may be used in order to transmit only longitudinal sensor signals of a specific frequency range. Other types of preprocessing are feasible. In the following, when referring to the longitudinal sensor signal, no difference will be made between the case in which the raw longitudinal sensor signal is used and the case in which a preprocessed longitudinal sensor signal is used for further evaluation.

As used herein, a "light beam" generally is an amount of light traveling into more or less the same direction. Thus, preferably, a light beam may refer to a Gaussian light beam, as known to the skilled person. However, other light beams, such as non-Gaussian light beams, are possible. As outlined in further detail below, the light beam may be emitted and/or reflected by an object. Further, the light beam may be reflected and/or emitted. The light beam may at least partially propagate substantially parallel to the optical axis of the detector. As used herein, "substantially parallel" refers to a beam axis which deviates not more than ±20°, preferably not more than ±10°, more preferably not more than ±5°, from the optical axis.

As outlined above, the longitudinal sensor signal, given the same total power of the illumination by the light beam, is dependent on a beam cross-section of the light beam in the sensor regions of the longitudinal optical sensors. As used herein, the term "beam cross-section" generally refers to a lateral extension of the light beam or a light spot generated by the light beam at a specific location. In case a circular light spot is generated, a radius, a diameter or a Gaussian beam waist or twice the Gaussian beam waist may function as a measure of the beam cross-section. In case non-circular light-spots are generated, the cross-section may be determined in any other feasible way, such as by determining the cross-section of a circle having the same area as the non-circular light spot, which is also referred to as the equivalent beam cross-section.

Thus, given the same total power of the illumination of the sensor region by the light beam, a light beam having a first beam diameter or beam cross-section may generate a first longitudinal sensor signal, whereas a light beam having a second beam diameter or beam-cross section being different from the first beam diameter or beam cross-section generates a second longitudinal sensor signal being different from the first longitudinal sensor signal. Thus, by comparing the longitudinal sensor signals, an information or at least one item of information on the beam cross-section, specifically on the beam diameter, may be generated. For details of this effect, reference may be made to WO 2012/110924 A1.

In the following, this effect generally will be referred to as the FiP-effect, since, given the same total power p of illumination, the sensor signal i is dependent on a flux of photons, i.e. the number of photons per unit area.

This effect, which is further disclosed in US provisional applications 61/739,173 and 61/749,964, may be used for determining a longitudinal position of an object from which the light beam travels towards the detector. Thus, since the sensor signal of the longitudinal optical sensor depends on a width, such as a diameter or radius, of the light beam on the sensor region, which again depends on a distance between the detector and the object, the longitudinal sensor signal may be used for determining a longitudinal coordinate of the object. The sensor region preferably may be a non-pixelated sensor region. Thus, as an example, the evaluation device may be adapted to use a predetermined relationship between a longitudinal coordinate of the object and a sensor signal in order to determine the longitudinal coordinate. The predetermined relationship may be derived by using empiric calibration measurements and/or by using known beam propagation properties, such as Gaussian beam propagation properties. For further details, reference may be made to WO 2012/110924 A1 and/or US provisional applications 61/739, 173 and 61/749,964.

For details of this FiP effect, reference may be made to one or more of WO 2012/110924 A1 or US provisional applications 61/739,173, filed on Dec. 19, 2012, 61/749,964, filed on Jan. 8, 2013, and 61/867,169, filed on Aug. 19, 2013, and WO2014/097181 A1. Specifically in case one or more beam properties of the light beam propagating from the object to the detector are known, the at least one item of information on the longitudinal position of the object may thus be derived from a known relationship between the at least one longitudinal sensor signal and a longitudinal position of the object. The known relationship may be stored in the evaluation device as an algorithm and/or as one or more calibration curves. As an example, specifically for Gaussian beams, a relationship between a beam diameter or beam waist and a position of the object may easily be derived by using the Gaussian relationship between the beam waist and a longitudinal coordinate.

Besides the longitudinal optical sensors, the detector may, optionally, comprise one or more additional optical sensors which are not longitudinal optical sensors according to the definition given herein. Thus, as an example, the detector may comprise a stack of optical sensors, wherein at least one of the optical sensors is a longitudinal optical sensor and wherein at least another one of the optical sensors is a different type of optical sensor, such as a transversal optical sensor and/or an imaging device, such as an organic imaging sensor and/or an inorganic imaging sensor like a CCD and/or CMOS chip.

Thus, the detector may further comprise at least one transversal optical sensor, the transversal optical sensor being adapted to determine a transversal position of at least one light beam traveling from the object to the detector, the transversal position being a position in at least one dimension perpendicular to an optical axis of the detector, the transversal optical sensor being adapted to generate at least one transversal sensor signal. The evaluation device may be designed to generate at least one item of information on a transversal position of the object by evaluating the transversal sensor signal. As used herein, the term transversal optical sensor generally refers to a device which is adapted to determine a transversal position of at least one light beam traveling from the object to the detector. With regard to the term transversal position, reference may be made to the definition given above. Thus, preferably, the transversal position may be or may comprise at least one coordinate in at least one dimension perpendicular to an optical axis of the detector. As an example, the transversal position may be a position of a light spot generated by the light beam in a plane perpendicular to the optical axis, such as on a light-sensitive sensor surface of the transversal optical sensor. As an example, the position in the plane may be given in Cartesian coordinates and/or polar coordinates. Other embodiments are feasible.

For potential embodiments of the transversal optical sensor, reference is made to WO2016/005893 A1 and one or more of the embodiments of the transversal optical sensors disclosed therein may also be used in the context of the present invention. However, other embodiments are feasible and will be outlined in further detail below.

It shall be noted that the at least one optional transversal optical sensor may be embodied as at least one separate component of the detector, which may form an independent component separate from the longitudinal optical sensors. Additionally or alternatively, however, the at least one transversal optical sensor may also be fully or partially embodied identical and/or to the longitudinal optical sensors and/or may fully or partially be integrated into the longitudinal optical sensors. The at least one transversal sensor signal generally may be an arbitrary signal indicative of the transversal position. As an example, the transversal sensor signal may be or may comprise a digital and/or an analog signal. As an example, the transversal sensor signal may be or may comprise a voltage signal and/or a current signal. Additionally or alternatively, the transversal sensor signal may be or may comprise digital data. The transversal sensor signal may comprise a single signal value and/or a series of signal values. The transversal sensor signal may further comprise an arbitrary signal which is derived by combining two or more individual signals, such as by averaging two or more signals and/or by forming a quotient of two or more signals.

Preferably, at least one of the transversal optical sensor and the longitudinal optical sensors is a transparent optical sensor. Thus, the at least one transversal optical sensor may be a transparent transversal optical sensor and/or may comprise at least one transparent transversal optical sensor. Additionally or alternatively, the longitudinal optical sensors may be transparent longitudinal optical sensors and/or may comprise at least one transparent longitudinal optical sensor. Preferably all longitudinal optical sensors of the plurality and/or the stack or all longitudinal optical sensors of the plurality and/or the stack but one longitudinal optical sensor are transparent. As an example, wherein the longitudinal optical sensors are arranged along the optical axis of the detector, preferably all longitudinal optical sensors but the last longitudinal optical sensor facing away from the object may be transparent longitudinal optical sensors. The last longitudinal optical sensor, i.e. the longitudinal optical sensor on the side of the stack facing away from the object, may be a transparent longitudinal optical sensor or an intransparent longitudinal optical sensor. For exemplary embodiments, reference is made to WO 2016/005893 A1.

The light beam may pass through the transparent optical sensor before impinging on the other one of the transversal optical sensor and the longitudinal optical sensor. Thus, the light beam from the object may subsequently reach the transversal optical sensor and the longitudinal optical sensor or vice versa.

For exemplary embodiments of the longitudinal optical sensors and the transversal optical sensor, reference is made to WO 2016/005893 A1.

As outlined above, in method step (i), the object is moved subsequently longitudinally to at least two different calibration positions having at least two different longitudinal coordinates within the range of measurement. As used herein, the term "longitudinally moving" refers to setting and/or adjusting different longitudinal distances between the object and the detector. As used herein, the term "two different calibration positions" refers to positions having different longitudinal coordinates. As used herein, the term "measurement range" refers to a distance range, in particular a desired distance range, in which determination of a longitudinal coordinate of the object is performed and/or is possible. Preferably, the object may be moved through the entire measurement range, in particular with a pre-defined or selected step size.

As outlined above, in method step (ii), for each of the calibration positions, at least one first longitudinal sensor signal generated by a first longitudinal optical sensor and at least one second longitudinal sensor signal generated by a second longitudinal optical sensor is recorded. As used herein, the term "recording" refers to receiving and/or collecting and/or determining and/or evaluating and/or storing the first and second longitudinal sensor signals. The terms "first" and "second" longitudinal optical sensor signals are used as names only and do not refer to an order of the signals or to that no further signals are present. The evaluation device may be adapted to record the first and second longitudinal sensor signals.

As outlined above, in method step (iii), for each of the calibration positions, at least one calibration signal using the first and second longitudinal sensor signals is formed. The evaluation device may be adapted to form the calibration signals. As used herein, the term "calibration signal" refers to a combined sensor signal for a position of the object determined by using the first and second longitudinal sensor signals. In particular, at each position of the object one of the first longitudinal sensor signal and the second longitudinal sensor signal may be divided by the other one of the first longitudinal sensor signal and the second longitudinal sensor signal. In particular, for each position of the object a quotient of the first longitudinal sensor signal and the second longitudinal sensor signal may be formed.

As outlined above, in method step (iv), a calibration function is generated using the calibration signals. The calibration function defines a relationship between the longitudinal coordinate of the object and the first and second longitudinal sensor signals. In particular, the calibration function refers to relationship between the calibration signal and the longitudinal coordinate of the object. Particularly preferably, the relationship comprises at least one calibration curve, at least one set of calibration curves, at least one function or a combination of the possibilities mentioned. One or a plurality of calibration curves can be stored for example in the form of a set of values and the associated function values thereof, for example in a data storage device and/or a table. Alternatively or additionally, however, the at least one calibration curve can also be stored, for example in parameterized form and/or as a functional equation. Various possibilities are conceivable and can also be combined.

As outlined above, the detector comprises at least one evaluation device. As used herein, the term "evaluation device" generally refers to an arbitrary device designed to generate the items of information, in particular the at least one item of information on the position of the object and/or at least one item of information on the reduction of the target light beam. As an example, the evaluation device may be or may comprise one or more integrated circuits, such as one or more application-specific integrated circuits (ASICs), and/or field programmable gate arrays (FPGAs), and/or digital signal processors (DSPs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the sensor signals, such as one or more AD-converters and/or one or more filters. As used herein, the sensor signal may generally refer to one of the longitudinal sensor signal and, if applicable, to the transversal sensor signal. Further, the evaluation device may comprise one or more data storage devices. Further, as outlined above, the evaluation device may comprise one or more interfaces, such as one or more wireless interfaces and/or one or more wire-bound interfaces.

The at least one evaluation device may be adapted to perform at least one computer program, such as at least one computer program performing or supporting the step of generating the items of information. As an example, one or more algorithms may be implemented which, by using the sensor signals as input variables, may perform a predetermined transformation into the position of the object.

By way of example, the evaluation device can be designed in terms of programming for the purpose of determining the items of information. The evaluation device can comprise in particular at least one computer, for example at least one microcomputer. Furthermore, the evaluation device can comprise one or a plurality of volatile or nonvolatile data memories. As an alternative or in addition to a data processing device, in particular at least one computer, the evaluation device can comprise one or a plurality of further electronic components which are designed for determining the items of information, for example an electronic table and in particular at least one look-up table and/or at least one application-specific integrated circuit (ASIC).

The method may comprise at least one measurement step. In the measurement step the longitudinal coordinate of the object and/or another object may be determined within the measurement range. In particular, the longitudinal coordinate of the object may be determined by recording the first sensor signal and the second sensor signal for this position of the object and by forming the combined sensor signal, in particular a quotient. The longitudinal coordinate may be determined by using the calibration function. Preferably, the measurement step may be performed after performing method steps i) to iv).

In an embodiment, the method further may comprise at least one adjustment step for positioning the first longitudinal optical sensor and the second longitudinal optical sensor. The adjustment step may comprise the following substeps:

a) positioning the object in at least one outermost position within the measurement range, the outermost position having a maximum longitudinal coordinate;
b) positioning the first longitudinal optical sensor at a longitudinal coordinate of the focused image plane;
c) positioning the object in at least one closest position within the measurement range, the closest position having a minimum longitudinal coordinate; and
d) positioning the second longitudinal optical sensor at a longitudinal coordinate of the focused image plane.

The substeps may be performed in the given order or in a different order. Further, two or more or even all of the method steps may be performed simultaneously and/or overlapping in time.

Further, one, two or more or even all of the method steps may be performed repeatedly. The method may further comprise additional method steps.

As used herein, the term "positioning" refers to setting or adjusting the position, in particular the longitudinal coordinate, of the respective component. The adjustment step may be performed before method step (i). The term "outermost position" refers to a position of the object having the most distant longitudinal coordinate, i.e. maximum longitudinal coordinate, of the measurement range.

The first longitudinal optical sensor may be positioned at the longitudinal coordinate of the focused image plane such that an image of the object on the sensor region of the first longitudinal optical sensor is minimized. The second longitudinal optical sensor may be positioned at the longitudinal coordinate of the focused image plane such that the image of the object on the sensor region of the second longitudinal optical sensor is minimized. As used herein, the term "image of the object is minimized" refers to that the image of the object is sharp and/or focused. In particular, a circle of confusion is minimal.

For example, in case of a positive FiP-effect, for example as described in WO2016/120392, the first longitudinal optical sensor may be positioned such that a first longitudinal sensor signal generated by the first longitudinal optical sensor is maximized. As used herein, the term "the first longitudinal sensor signal is maximized" refers to a position of the first longitudinal optical sensor in which the first longitudinal sensor signal exhibit a global maximum for this object distance and radiant power. The first longitudinal sensor signal may exhibit the maximum at a longitudinal coordinate of the focal plane at which collected light originating from the object in the outermost position is focused by the transfer device. For example, the first longitudinal sensor signal may be maximized by, firstly, positioning the first longitudinal optical sensor at an arbitrary distance to the transfer device, in particular to a site of the transfer device opposite to the object, and, subsequently, by moving the first longitudinal optical sensor stepwise or continuously longitudinally away from or to the transfer device.

For example, in case of a negative FiP-effect, for example as described in WO2016/120392, the first longitudinal optical sensor may be positioned such that the first longitudinal sensor signal generated by the first longitudinal optical sensor is minimized. As used herein, the term "the first longitudinal sensor signal is minimized" refers to a position of the first longitudinal optical sensor in which the first longitudinal sensor signal exhibits a global minimum for this object distance and luminance.

For example, in case of using a longitudinal optical sensor exhibiting both positive and negative FiP-effect, for example as described in WO 2017/093453 A1, the first longitudinal optical sensor may be positioned such that the first longitudinal sensor signal has a local minimum.

As used herein, the term "closest position" refers to a position of the object having the closest longitudinal coordinate, i.e. minimum longitudinal coordinate, of the measurement range. The closest position may be defined by design of the transfer device, in particular of a longitudinal extension.

For example, in case of a positive FiP-effect, for example as described in WO2016/120392, the second longitudinal optical sensor may be positioned such that a second longitudinal sensor signal generated by the second longitudinal optical sensor is maximized. As used herein, the term "the second longitudinal sensor signal is maximized" refers to a position of the second longitudinal optical sensor in which the second longitudinal sensor signal exhibits a global maximum for this object distance and luminance. The second longitudinal sensor signal may exhibit the maximum at a longitudinal coordinate of the focal plane at which collected light originating from the object in the closest position is focused by the transfer device. For example, the second longitudinal sensor signal may be maximized by, firstly, positioning the second longitudinal optical sensor at an arbitrary distance to the first longitudinal optical sensor, in particular to a site of the first longitudinal optical sensor opposite to the transfer device such that the first longitudinal optical sensor is positioned in between the transfer device and the second longitudinal optical sensor, and, subsequently, by moving the second longitudinal optical sensor stepwise or continuously longitudinally away from or toward the first longitudinal optical sensor.

For example, in case of a negative FiP-effect, for example as described in WO2016/120392, the second longitudinal optical sensor may be positioned such that the second longitudinal sensor signal is minimized. As used herein, the term "the second longitudinal sensor signal is minimized" refers to a position of the second longitudinal optical sensor in which the second longitudinal sensor signal exhibits a global minimum for this object distance and luminance.

For example, in case of using a longitudinal optical sensor exhibiting both positive and negative FiP-effect, for example as described in WO 2017/093453 A1, the second longitudinal optical sensor may be positioned such that the second longitudinal sensor signal has a local minimum.

The adjusted positions of the first longitudinal optical sensor and second longitudinal optical sensor may differ. The adjusted position of the first longitudinal optical sensor may be closer to the transfer device than the adjusted position of the second longitudinal optical sensor. Adjusting the position of the first and second longitudinal optical sensors using the proposed method allows that change of quotient over the measurement range is maximized. This allows best resolution to distinguish different longitudinal coordinates of the object.

In an embodiment, the method further may comprise at least one positioning step for positioning the first longitudinal optical sensor and the second longitudinal optical sensor. The positioning step may comprise the following substeps:

A) positioning the object in the at least one outermost position within the measurement range, the outermost position of having the maximum longitudinal coordinate, and positioning the first longitudinal optical sensor at a longitudinal position in between the transfer device and the focal plane of the transfer device; and B) positioning the second longitudinal optical sensor at a longitudinal coordinate of a focused image plane.

The substeps may be performed in the given order or in a different order. Further, two or more or even all of the method steps may be performed simultaneously and/or overlapping in time.

Further, one, two or more or even all of the method steps may be performed repeatedly. The method may further comprise additional method steps. Preferably, the positioning step may be performed before method step (i).

Step A) may comprise the following substeps:

A1) defining a sensor threshold for the first longitudinal sensor signal;

A2) moving the first longitudinal optical sensor towards the focal plane and comparing the first longitudinal sensor signal with the sensor threshold; and A3) positioning the first longitudinal optical sensor at a position at which the first longitudinal sensor signal equals the sensor threshold.

As used herein, the term "positioned at a longitudinal position in between the transfer device and the focal plane of the transfer device" refers to an arbitrary longitudinal coordinate between the transfer device and the focal plane, in particular on the optical axis of the transfer device. Although, as outlined above, the first longitudinal optical sensor may be positioned in an arbitrary position between the transfer device and the intersection point of normalized longitudinal optical sensor current, the first longitudinal optical sensor may preferably placed sufficiently far from the transfer device in order to generate a longitudinal sensor signal distinguishable from a response of a noise-image. The term "noise-image" refers to an image in which measurement signal and noise cannot be distinguished. As used herein, the term "defining a sensor threshold" refers to a pre-determining and/or selecting the sensor threshold. The sensor threshold may be defined such that the first longitudinal sensor signal can be used for distance measurements, in particular that the measurement signal is distinguishable from the noise image and/or baseline. The sensor threshold may be a threshold for change of longitudinal sensor signal. In particular, the sensor threshold may be defined to be the change of the longitudinal sensor signal by at least a noise value of the longitudinal sensor signal. For example, in order to determine the position of the first longitudinal optical sensor, the first longitudinal optical sensor may be placed close to the transfer device, in particular as close as possible to the transfer device, and the longitudinal sensor signal may be determined. Subsequently, distance of the first longitudinal optical sensor from the transfer device may be increased by moving, e.g. step wise, the first longitudinal optical sensor away from the transfer device, in particular along the optical axis. The longitudinal sensor signal may be determined, e.g. at each step or in case of continuous moving at at least two determined or specified points along the optical axis. The first longitudinal optical sensor may be positioned at a position at which the longitudinal sensor signal is increased in case of positive FiP effect, or decreased in case of negative FiP effect by at least the noise value. In particular, the distance may be increased until the sensor signal is increased significantly more than by the noise value. However, preferably, change of the sensor signal may be in a range from 2× to 1000× noise value, more preferably in a range from 5× to 100× noise value and most preferably below 100× noise value. The first longitudinal optical sensor is positioned at a position at which the first longitudinal sensor signal equals the sensor threshold. In particular, the first longitudinal optical sensor may be positioned at the position at which the first longitudinal sensor signal equals the sensor threshold within tolerances of ±10%, preferably ±5%, more preferably ±1%.

As outlined above, the second longitudinal optical sensor may be positioned at a longitudinal coordinate of the focused image plane. The transfer device has a focal length f. The longitudinal coordinate corresponding to the focal length and the focused image plane may differ. In particular, the longitudinal coordinate corresponding to the focal length may be closer to the transfer device than the longitudinal coordinate of the focused image plane.

Under the following assumptions that the object is an infinitesimal point, that the optical setup can be modeled by the paraxial optics, i.e. the model is based on the thin lens equation $1/f=1/z+1/b$, wherein f is the focal length of the transfer device, z is the distance from the object to the transfer device and b is a position of an optical image of the object, and that the sensor area is sufficient large, i.e. the sensor cannot be over framed by the optical image, the optical image on the longitudinal optical sensor corresponds to the circle of confusion. A radius $c_r$ of the image is given by $$c_r = \left| R\left(1 - b_0 \frac{z-f}{zf}\right)\right|,$$

wherein $b_0$ is the distance between the transfer device and the longitudinal optical sensor and R is the radius of the transfer device.

Radiant power can be modeled by the function L $$L(z) = \frac{\lambda_0}{z^2},$$

wherein $\lambda_0$ is a parameter characterizing properties of the light source.

The light density distribution E(z) of the optical image on the sensor is given by $$E(z) = \begin{cases} \frac{1}{\pi c_r^2} L(z) & \|x\| \le c_r, \\ 0 & \|x\| > c_r. \end{cases}$$

The sensor response can be described as spatial integral over the light density distribution, i.e.

$$I(z) = \int F(E(x))dx = \pi c_r^2 \cdot F\left(\frac{1}{\pi c_r^2} \cdot L(z)\right),$$

wherein F is a nonlinear sensor response function.

The normalized sensor response is defined by $$I_{norm} = \frac{I(z)}{L(z)}.$$

In case the longitudinal optical sensor is positioned at a position $b_0 = f$, the image reduces to $$c_r = \frac{R \cdot f}{z},$$

and the normalized sensor response yields to $$I_{norm} = \frac{\pi R^2 f^2}{z^2} F\left(\frac{z^2}{\pi R^2 f^2} L(z)\right) L(z)^{-1} =$$

$$\frac{\pi R^2 f^2}{z^2} F\left(\frac{z^2}{\pi R^2 f^2} \frac{\lambda_0}{z^2}\right) \frac{z^2}{\lambda_0} = \frac{\pi R^2 f^2}{\lambda_0} F\left(\frac{\lambda_0}{\pi R^2 f^2}\right).$$

Thus, the normalized sensor response does not depend on the distance z. If the longitudinal optical sensor is positioned at $b_0 = f$, then the area of the optical image is proportional to the number of photons impinging on the sensor. This yields, that the photon density of the optical image is constant. The quantum efficiency per area is also constant. Thus, the photocurrent of the sensor must be proportional to the area of the optical image. Finally, the photocurrent is proportional to the number of collected photons. Thus, in case the normalized sensor response is determined for different object distances as a function of the position of the longitudinal sensor behind the transfer device, an array of curves is observed, wherein all curves intersect at a range or point of intersection at $b_0 = f$, in particular in a range within $f \pm \varepsilon$, wherein $|\varepsilon| \le 0.2 \cdot f$, preferably $|\varepsilon| \le 0.01 \cdot f$, more preferably $|\varepsilon| \le 0.05 \cdot f$, and most preferably $|\varepsilon| \le 0.01 \cdot f$. Under the assumptions, as outlined above, all curves intersect exactly at $b_0 = f$.

The method may comprise at least one step, in which the range or point of intersection is determined. The range or point of intersection may be determined during step E) and/or before step E). For example, at least one array of curves of normalized sensor response may be determined for different object distances as a function of the position of at least one of longitudinal sensors behind the transfer device and the point or range of intersection may be determined.

As outlined above, the second longitudinal optical sensor may be positioned at the focused image plane. The longitudinal coordinate of the focused image plane may be different from $b_0 = f$. In particular, the second longitudinal optical sensor may be positioned at the focused image plane, in particular at a position different from the focal plane. In particular, a distance between transfer device and the focused image plane may be greater than a distance between transfer device and longitudinal coordinate corresponding to the focal length of the transfer device. In particular, the longitudinal coordinate corresponding to the focal length may be in between the transfer device and the focused image plane.

Preferably, the first longitudinal optical sensor may be positioned in between the transfer device and the point or range of intersection. For example, the first longitudinal optical sensor and the second longitudinal optical sensor may be arranged such that the point or range of intersection is located between the first longitudinal optical sensor and the second longitudinal optical sensor. However, distance from the point or range of intersection to the first longitudinal optical sensor and distance from the point or range of intersection to the second longitudinal optical sensor may be different.

Astonishingly, it was found that an arrangement, wherein the first longitudinal optical sensor and the second longitudinal optical sensor are arranged such that the point or range of intersection is located between the first longitudinal optical sensor and the second optical sensor, allows that change of quotient over the measurement range is maximized. This allows best resolution to distinguish different longitudinal coordinates of the object.

The second longitudinal optical sensor may be arranged in the focused image plane. The object may still be positioned at the outermost position.

The detector may comprise at least one illumination source for illuminating the object. The illumination source can be embodied in various ways. Thus, the illumination source can be, for example part of the detector in a detector housing. Alternatively or additionally, however, the at least one illumination source can also be arranged outside a detector housing, for example as a separate light source. The illumination source can be arranged separately from the object and illuminate the object from a distance. However, embodiments are feasible, wherein the object may, additionally or alternatively, be illuminated by ambient light. Ambient light may be present due to additional light source such as artificial light source or natural light source. The light source may further comprise a light beam homogenizer and/or a light pipe homogenizer. The light source may be or may comprise at least one homogeneous light source and/or may be or may comprise at least one structured light source and/or patterned light source. As an example, a structure or patterned light source may be provided by using one or more spatial light modulators (SLMs), such as one or more of a liquid crystal spatial light modulator and/or one or more micromechanical mirror devices such as using DLP® technology.

The illumination light preferably may have a wavelength in the infrared spectral range. The illumination source can comprise in particular one or a plurality of the following illumination sources: a laser, in particular a laser diode, for example an IR laser diode with output wavelength in the infrared part of the electromagnetic spectrum, although in principle, alternatively or additionally, other types of lasers can also be used; a light emitting diode; an incandescent lamp; an organic light source, in particular an organic light emitting diode. The infrared part of the electromagnetic spectrum preferably refers to a spectral range of 780 nm to 1 mm, preferably 780 nm to 3.0 µm. Alternatively or additionally, other illumination sources can also be used. It is particularly preferred if the illumination source is designed to generate one or more light beams having a Gaussian beam profile, as is at least approximately the case for example in many lasers. However, other embodiments are also possible, in principle.

Further, the at least one evaluation device may be formed as a separate evaluation device independent from the longitudinal optical sensors, but may preferably be connected to the longitudinal optical sensors in order to receive the longitudinal sensor signal. Alternatively, the at least one evaluation device may fully or partially be integrated into the longitudinal optical sensors.

The at least one evaluation device may be adapted to perform at least one computer program, such as at least one computer program performing or supporting generation of the at least one item of information on the longitudinal position. As an example, one or more algorithms may be implemented which, by using the longitudinal sensor signal as input variables, may perform a predetermined transformation into the longitudinal position of the object. The evaluation device may comprise at least one data processing device, such as at least one microcontroller or processor. Thus, as an example, the at least one evaluation device may comprise at least one data processing device having a software code stored thereon comprising a number of computer commands.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected to or incorporate at least one of a communication device or communication interface, a datalink, a timex datalink, a connector or a port, capable of sending encrypted or unencrypted information using one or more of email, text messages, telephone, bluetooth, radio, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses and/or may contain one or more transmitters and/or receivers.

The evaluation device and/or the data processing device may be connected by or have further external interfaces or ports such as one or more of serial or parallel interfaces or ports, USB, Centronics Port, FireWire, HDMI, Ethernet, Bluetooth, RFID, radio, datalink, Wi-Fi, USART, or SPI, or analog interfaces or ports such as one or more of ADCs or DACs, or standardized interfaces or ports to further devices such as a 2D-camera device using an RGB-interface such as CameraLink. The evaluation device and/or the data processing device may further be connected by one or more of interprocessor interfaces or ports, FPGA-FPGA-interfaces, or serial or parallel interfaces or ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

In a further aspect of the present invention, a detector for determining a position of at least one object is disclosed. The detector may be adapted to perform the method according to one or more embodiments as described above or described in further detail below. With respect to embodiments and definitions of the detector and components of the detector reference is made to definitions and embodiments of the method disclosed above or disclosed in further detail below.

The detector comprises:
at least one transfer device for imaging the object into a focused image plane, the transfer device having a focal plane,
at least two longitudinal optical sensors, wherein each of the longitudinal optical sensors has at least one sensor region, wherein each of the longitudinal optical sensors is designed to generate at least one longitudinal sensor signal in a manner dependent on an illumination of the sensor region by at least one light beam propagating from the object to the detector, wherein the longitudinal sensor signal, given the same total power of the illumination, is dependent on a beam cross-section of the light beam in the sensor region;
at least one evaluation device, wherein the detector is adapted to move the object subsequently to at least two different calibration positions having at least two different longitudinal coordinates within a range of measurement, wherein the evaluation device is adapted to record, for each of the calibration positions, at least one first longitudinal sensor signal generated by a first longitudinal optical sensor and at least one second longitudinal sensor signal generated by a second longitudinal optical sensor, wherein the evaluation device is adapted to form, for each of the calibration positions, at least one calibration signal using the first and second longitudinal sensor signals, wherein the evaluation device is designed to generate a calibration function using the calibration signals, the calibration function defining a relationship between the longitudinal coordinate of the object and the first and second longitudinal sensor signals.

The detector may comprise at least one setting device adapted for moving the longitudinal optical sensors. The detector components such as the longitudinal optical sensors and/or the transfer device may be movable arranged. For example, the detector may comprise at least one mounting device on which the optical sensors and/or the transfer device can be arranged and by which the optical sensors and/or the transfer device can be moved. The mounting device may comprise one or more of at least one mechanical or optomechanical mount such as at least one optical mount and/or at least one kinematic mount, at least one rail mounting system, at least one slider, at least one rail and/or at least one rail system, at least one optical table. The evaluation device may be configured for controlling the mounting device. Specifically, the evaluation device may be configured for controlling movement of sliders for moving the detector components. The evaluation device and the setting device may be connected by one or more connectors. The evaluation device may be configured for generating position information and/or position instructions for positioning the detector components on the rail. The evaluation device may be configured for displaying the position information and/or position instructions, e.g. for manual movement by a user. The detector may be configured for manual movement of the optical sensors and/or the transfer device. The detector may be configured for simultaneously moving the longitudinal optical sensors. The detector may be configured for subsequently moving of the longitudinal optical sensors.

The detector may comprise at least one object positioning device. The object positioning device may be adapted to mount the object such as by using at least one mount and/or holder. The object may be movable arranged. For example, the object may be moved by the object positioning device. The object positioning device may comprise at least one rail mounting system comprising at least one slider and at least one rail and/or at least one rail system. The rail of the mounting device and of the object positioning device may be identical. For example, the object and the longitudinal optical sensors may be moved on the same rail. Alternatively, different rails may be used. The evaluation device may be configured for controlling the object positioning device. Specifically, the evaluation device may be configured for controlling movement of sliders for moving the object. The evaluation device and the object positioning device may be connected by one or more connectors. The evaluation device may be configured for generating position information and/or position instructions for positioning the object on the rail. The evaluation device may be configured for displaying the position information and/or position instructions, e.g. for manual movement by a user. The detector may be configured for manual movement of the object, for example by moving the object positioning device.

The detector may be configured for simultaneously moving the object and/or at least one of the longitudinal optical sensors. The detector may be configured for subsequently moving of the object and for moving of at least one of the longitudinal optical sensors. The evaluation device may be configured for automatically moving the object and/or the longitudinal optical sensors. For example, the evaluation device may comprise at least one processor configured for generating position information and/or position instructions for positioning of the object and/or of the longitudinal optical sensors. The evaluation device may comprise at least one storage device comprising at least one table and/or look-up table, wherein the at least two calibration positions having the at least two different longitudinal coordinates within the range of measurement are stored.

The evaluation device may be designed to generate at least one item of information on a longitudinal position of the object by evaluating at least one of the longitudinal sensor signals. As used herein, the term "item of information on a longitudinal position" refers to at least one distance between at least one point of the object and the at least one detector. The position may relate to the entire object or else only a part, for example a point, an area or a region of the object. Said part can be arranged on a surface of the object or else at least partly within the object.

The detector may be adapted to perform at least one adjustment step for positioning the first longitudinal optical sensor and the second longitudinal optical sensor. Preferably the adjustment step may be performed before method step (i). The adjustment step may comprise the following sub-steps:

a) positioning the object in at least one outermost position within the measurement range, the outermost position of having a maximum longitudinal coordinate;

b) positioning the first longitudinal optical sensor at a longitudinal coordinate of the focused image plane;

c) positioning the object in at least one closest position within the measurement range, the closest position of having a minimum longitudinal coordinate; and d) positioning the second longitudinal optical sensor at a longitudinal coordinate of the focused image plane.

The evaluation device may be configured to determine the outermost position within the measurement range and/or to generate at least one information and/or instructions for positioning the object at the determined position. The evaluation device may be configured for providing the generated information and/or instructions to the object positioning device for positioning the object at the determined position and/or to display the generated information and/or instructions for manual movement by a user. Specifically after the object was positioned at the determined outermost position, the evaluation device may be configured to determine the focused image plane and/or to generate at least one information and/or instructions for positioning the first longitudinal optical sensor at the determined position. The evaluation device may be configured for providing the generated information and/or instructions to the setting device for positioning the first longitudinal optical sensor at the determined position and/or to display the generated information and/or instructions for manual movement by a user. The evaluation device may be configured to determine the closest position within the measurement range and/or to generate at least one information and/or instructions to the object positioning device for positioning the object at the determined position. The evaluation device may be configured for providing the generated information and/or instructions to the object positioning device for positioning the object at the determined position and/or to display the generated information and/or instructions for manual movement by a user.

Specifically after the object was positioned at the determined closest position, the evaluation device may be configured to determine the focused image plane and/or to generate at least one information and/or instructions for positioning the second longitudinal optical sensor at the determined position. The evaluation device may be configured for providing the generated information and/or instructions to the setting device for positioning the second longitudinal optical sensor at the determined position and/or to display the generated information and/or instructions for manual movement by a user.

The detector may be adapted to perform at least one positioning step for positioning the first longitudinal optical sensor and the second longitudinal optical sensor. The positioning step preferably may be performed before method step (i). The positioning step may comprise the following substeps:

A) positioning the first longitudinal optical sensor at a longitudinal position in between the transfer device and a focal plane of the transfer device;

B) positioning the second longitudinal optical sensor at a longitudinal coordinate of the focused image plane.

The evaluation device may be configured to determine the longitudinal position of the transfer device and of the focal plane of the transfer device. The evaluation device may be configured for determining a longitudinal position between the longitudinal position of the transfer device and of the focal plane of the transfer device. The evaluation device may be configured for generating at least one information and/or instructions for positioning the first longitudinal optical sensor at the determined longitudinal position. The evaluation device may be configured for providing the generated information and/or instructions to the setting device for positioning the first longitudinal optical sensor at the determined longitudinal position and/or to display the generated information and/or instructions for manual movement by a user. The evaluation device may be configured to determine the longitudinal position of the focused image plane and/or for generating at least one information and/or instructions for positioning the second longitudinal optical sensor at the determined longitudinal position. The evaluation device may be configured for providing the generated information and/or instructions to the setting device for positioning the second longitudinal optical sensor at the determined longitudinal position and/or to display the generated information and/or instructions for manual movement by a user.

Step A) may comprise the following substeps:

A1) defining a sensor threshold for the first longitudinal sensor signal;

A2) moving the first longitudinal optical sensor towards the focal plane and comparing the first longitudinal sensor signal with the sensor threshold; and A3) positioning the first longitudinal optical sensor at a position at which the first longitudinal sensor signal equals the sensor threshold.

The evaluation device may be configured for defining the sensor threshold for the first longitudinal optical sensor. The evaluation device may comprise at least one storage device comprising at least one table and/or look-up table in which at least one sensor threshold may be stored. The evaluation device may be adapted to select the sensor threshold, for example such that the first longitudinal sensor signal can be used for distance measurements, in particular that the measurement signal is distinguishable from the noise image and/or baseline. The evaluation device may be adapted for comparing the first longitudinal sensor signal with the sensor threshold. The evaluation device may be configured for generating at least one information and/or instructions for positioning the first longitudinal optical sensor at the position at which the first longitudinal sensor signal equals the sensor threshold. The evaluation device may be configured for providing the generated information and/or instructions to the setting device for positioning the first longitudinal optical sensor at the determined position and/or to display the generated information and/or instructions for manual movement by a user.

As outlined above, at least one of the longitudinal optical sensors may be at least partially transparent. The detector may comprise at least one imaging device. The detector may be adapted to image the object through the longitudinal optical sensors. The detector further may comprise at least one imaging device, wherein the imaging device may be adapted such that the light beam traveling from the object to the detector passes through with the longitudinal optical sensor before impinging on the imaging device.

As used herein, an imaging device is generally understood as a device which can generate a one-dimensional, a two-dimensional, or a three-dimensional image of the object or of a part thereof. In particular, the imaging device can be completely or partly used as a camera. For example, the imaging device may be a camera selected from the group consisting of: an RGB camera, i.e. a camera which is designed to deliver three basic colors which are designated as red, green, and blue, on three separate connections; an IR camera, i.e. a camera which is designed to record parts of the light beam in the infrared spectral range; although in principle, alternatively or additionally, other types of cameras can also be used. Other embodiments of the imaging device are also possible.

The imaging device may be designed to image a plurality of partial regions of the object successively and/or simultaneously. By way of example, a partial region of the object can be a one-dimensional, a two-dimensional, or a three-dimensional region of the object which is delimited, for example by a resolution limit of the imaging device and from which electromagnetic radiation emerges.

In this context, imaging should be understood to mean that the electromagnetic radiation which emerges from the respective partial region of the object is fed into the imaging device, for example by means of at least one optional transfer device of the detector.

In particular, the imaging device can be designed to image sequentially, for example by means of a scanning method, in particular using at least one row scan and/or line scan, the plurality of partial regions sequentially. However, other embodiments are also possible, for example embodiments in which a plurality of partial regions is simultaneously imaged. The imaging device is designed to generate, during this imaging of the partial regions of the object, signals, preferably electronic signals, associated with the partial regions. The signal may be an analogue and/or a digital signal. By way of example, an electronic signal can be associated with each partial region. The electronic signals can accordingly be generated simultaneously or else in a temporally staggered manner. By way of example, during a row scan or line scan, it is possible to generate a sequence of electronic signals which correspond to the partial regions of the sample, which are strung together in a line, for example. Further, the imaging device may comprise one or more signal processing devices, such as one or more filters and/or analogue-digital-converters for processing and/or preprocessing the electronic signals.

The imaging device may comprise a camera chip, for example a CCD chip and/or CMOS chip. Preferably, the imaging device may comprise an inorganic imaging device. The imaging device may comprise a matrix of pixels. As used herein, a pixel generally refers to a light-sensitive element of the imaging device. As used here, a "matrix" generally refers to an arrangement of a plurality of the pixels in space, which may be a linear arrangement or an areal arrangement. Thus, generally, the matrix preferably may be selected from the group of: a one-dimensional matrix; a two-dimensional matrix. Most preferably, the matrix is a rectangular matrix having pixels arranged in rows and columns. The imaging device may comprise a chip selected from the group consisting of a CMOS chip and a CCD chip. Further the imaging device may be adapted to resolve colors. The at least one imaging device may be or may comprise at least one full-color CCD chip and/or at least one full-color CMOS chip. In a preferred embodiment, the imaging device may be an RGB camera and/or an IR camera.

Possible embodiments of a device such as a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, a 3D-camera functionality may be provided which may be integrated in devices that are available with conventional 2D-digital cameras, without a noticeable difference in the housing or appearance of the device, where the noticeable difference for the user may only be the functionality of obtaining and or processing 3D information.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design. Devices according to the present invention may be especially suitable for the integration in automotive application, specifically due to the possibility of reducing the amount of data generated, as compared to conventional 3D-sensing technologies.

As outlined above, the at least one illumination source is adapted to illuminate the at least one object with illumination light. For example, the at least one object may be illuminated with light through the longitudinal optical sensor. Additionally or alternatively, further be adapted to illuminate the at least one object in other ways, such as by illumination light which is not transmitted through the longitudinal optical sensors. Thus, at least one illumination source may be placed outside a beam path of the detector, in order to illuminate the at least one object in an off-axis fashion.

The illumination light generally, in case an illumination through the longitudinal optical sensor takes place and/or in case a different type of illumination is used, optionally may imply at least one reflection of the illumination light before the illumination light illuminates the at least one object. Thus, generally, the detector may further comprise at least one reflective element, wherein the reflective element is adapted to reflect the illumination light before illuminating the object. The use of at least one reflective element generally implies several advantages. Thus, generally, by using at least one reflective element, an adjustment of an orientation of the illumination light, such as an illumination light beam, may be performed by adjusting the at least one reflective element. Further, the at least one reflective element, as will be outlined in further detail below, may be a wavelength-selective reflective element, the reflection properties of which may depend on the wavelength. Thus, generally, the wavelength-selective reflective element may be or may comprise at least one infrared reflective element which exhibits reflective properties in the infrared spectral region, whereas, in other spectral regions such as the visible spectral region, no reflective properties or significantly lower reflective properties as compared to the infrared spectral region may be present. Thus, generally, the at least one illumination source may comprise at least one infrared illumination source for illuminating the at least one object with infrared illumination light, and the at least one reflective element may comprise at least one reflective element exhibiting reflective properties in the infrared spectral region, such as a so-called "hot" mirror.

When illuminating the at least one object with illumination light, be it through the longitudinal optical sensors and/or be it in a different fashion, the at least one illumination light may be fixed in direction and/or space and/or may be adjustable or movable in direction and/or space. Thus, as an example, the reflective element may be or may comprise at least one movable reflective element adapted to be adjusted to at least two different positions, wherein, in the at least two different positions, the illumination light is reflected into different directions. Thus, at least one longitudinal translation of the movable mirror and/or at least one rotational movement of the at least one movable mirror may be feasible.

Thus, as an example, the at least one movable reflective element may be a reflective element the orientation of which may be adjusted to at least one first orientation and at least one second orientation being different from the at least one first orientation. The adjustment may take place in a stepwise or a continuous fashion.

In case the at least one reflective element comprises at least one movable reflective element, the movable reflective element may be a single movable reflective element or may be or may comprise a plurality of movable reflective elements. Thus, the at least one reflective element may comprise a plurality of movable reflective elements, such as a plurality of movable mirrors, preferably a plurality of micromirrors. Thus, as an example, the at least one movable reflective element may comprise a plurality of micro-mirrors, specifically an area of micro-mirrors, such as micro-mirrors based on piezo technology. As an example, micro-mirrors as used in projection technology may be used, such as micro-mirrors available for beamers or other types of projectors. As an example, digital light processing (DLP®) technology, such as the light processing technology available from Texas Instruments, may be used. More specifically, at least one DLP®-chip may be used. More generally, a reflective spatial light modulator may be used and/or the at least one movable reflective element may comprise at least one reflective spatial light modulator.

By using a plurality of movable reflective elements, the illumination light may be subdivided into a plurality of illumination light beams, the position/orientation of which, preferably, may individually be controlled by the plurality of movable reflective elements. Thereby, as an example, a projection of various patterns and/or a modulation of points and/or patterns of the illumination light beams are feasible. In case a plurality of movable reflective elements is used, an individual control of the movable reflective elements may take place, such as an individual control at different control frequencies. Thereby, an illumination of the at least one object by the plurality of illumination light beams and/or by a pattern of illumination light beams at different frequencies is feasible. Consequently, the illumination may take place in a modulated fashion, such as by periodically controlling the movable reflective element at different modulation frequencies. The illumination may then be resolved by the detector, such as by the one or more FiP-sensors contained therein, such as by demodulating one or more of the detector signals and/or by a frequency analysis.

By using a plurality, specifically an array, of movable reflective elements, specifically an array of mirrors and/or a reflective spatial light modulator, and more specifically a DLP® array, a projection of illumination light patterns may be performed, such as for projecting generic patterns and/or specialized patterns into a field of view of the detector, such as for covering a complete or partial measurement space of the detector.

Further, by using the plurality of movable reflective elements, more specifically an array of movable reflective elements, such as an array of mirrors, a reflective spatial light modulator and/or a DLP® array, the plurality of movable reflective elements may be used for projecting points and/or patterns of the illumination light into space, specifically into a field of view of the detector, such as into an image of a camera, specifically for following one or more specific objects in space, such as for following limbs, toys or other object or parts thereof.

In case a pattern and/or array of the movable reflective element is used, such as one or more DLP® chips, the pattern itself may be a generic pattern or may be a dedicated pattern for the detector, such as a pattern dependent on a RGB-camera picture.

In case the at least one reflective element is or comprises at least one movable reflective element, the at least one movable reflective element may be adapted to scan the illumination light through at least one scan region in space. Again, the scanning process may take place in a continuous fashion or in a stepwise fashion. Thus, as an example, the at least one movable reflective element may comprise at least one movable mirror, such as a galvo-scanner or any other type of movable mirror, the position and/or orientation of which may be adjusted.

In case at least one movable reflective element is used, the adjustment of the at least one movable reflective element may take place in a manual fashion and/or in an automatic fashion.

Thus, as an example, the at least one detector may comprise at least one actuator adapted for adjusting the position of the at least one movable mirror. As an example, the at least one actuator may be or may comprise at least one adjustment screw and/or at least one other type of actuator, such as at least one piezo actuator.

The at least one optional movable reflective element, as an example, may comprise a matrix of movable reflective elements. Thus, as an example, a micromechanical mirror device may be used, comprising an array of movable micro-mirrors, such as by using the so-called DLP® technology by Texas Instruments. By using one or more movable reflective elements, one or more patterns and/or fringes may be generated and/or projected.

As outlined above, the illumination source generally and specifically may be adapted to emit illumination light in one or more of the visible spectral range, the infrared spectral range and the ultraviolet spectral range. Specifically, the illumination light may be illumination light in the infrared spectral range. Thus, as outlined above, the reflective element may be adapted to reflect light in the infrared spectral range, wherein light in the visible spectral range is transmitted. Other combinations of reflective properties in the different spectral ranges are feasible. Specifically, the at least one reflective element may comprise at least one movable reflective element having reflective properties in the infrared spectral range, such as a movable infrared mirror, specifically a movable "hot" mirror.

The at least one reflective element generally may be an arbitrary element adapted to fully or partially reflect or redirect the illumination light in space. As the skilled person will recognize, various types of reflective elements are generally known and may be used herein. Specifically, the reflective element may be selected from the group consisting of: a mirror; a semitransparent mirror; a mirror or semi-transparent mirror reflecting only specific spectral regions, such as light in the infrared spectral range; a prism; a dichroitic mirror; a beam splitter cube. Combinations of the named elements and/or other types of reflective elements are feasible. Specifically, as will be outlined in further detail below, the at least one reflective element may exhibit beam-splitting properties, and, thus, the at least one reflective element, be it a rigid reflective element or a movable reflective element, may fully or partially be identical to at least one beam-splitting device which may be present in the detector.

The use of at least one reflective element, specifically the use of at least one movable reflective element, more specifically the use of at least one movable reflective element having reflective properties in the infrared spectral range, provides a large number of advantages, as partially outlined above. Thus, as an example, current distance sensors as commercially available e.g. in the field of gaming, generally may project a point pattern into the space to be analyzed. The point pattern may be monitored by using at least one camera, and appropriate measurement algorithms may be applied. This process requires a significant amount of computing power. Contrarily, the detector according to the present invention, provides an easy way of simplifying the detection process. The illumination light, such as infrared illumination light, more specifically a single infrared light beam, may be moved through the space to be analyzed, by using the movable reflective element such as a movable infrared mirror. In this setup, the required computational resources may significantly be reduced as compared to conventional detectors.

Thus, a scanning process may be applied. The movable mirror allows for reading out e.g. line patterns, square patterns or other patterns. Thus, the detector, specifically the detector comprising one or more longitudinal optical sensors, more specifically comprising one or more organic solar cells and/or DSCs and/or sDSCs, may provide a direct and fast longitudinal information such as a distance information. The movable reflective element, such as the movable mirror, generally may be adapted for tracking the at least one object by adjusting the at least one position of the at least one movable reflective element according to the position of the object. Thereby, the detector may be adapted for tracking and/or analyzing specific objects, such as humans, faces, limbs or other movable objects or combinations of movable object.

The at least one object may comprise or may be combined with at least one beacon device, also referred to as a target device, which may be adapted to emit at least one light beam and/or to transmit at least one light beam towards the detector. For potential embodiments of the at least one beacon device, reference may be made e.g. to WO 2012/110924 A1. Other embodiments are feasible. Thus, generally, the at least one beacon device may be or may comprise at least one passive beacon device adapted to reflect light such as the illumination light and/or may be or may comprise at least one active device adapted for emitting light. Thus, generally, one or more actively emitting target devices and/or reflecting targets devices may be used, specifically in combination with a movable reflective device. In the setup, as an example, a movable infrared light beam may be used as illumination light and/or as a part of the illumination light, and the detector may be adapted to measure patterns and/or specific regions in space and/or may be adapted to track specific objects.

The detector may further comprise the at least one imaging device such as at least one camera, more specifically a full-color camera such as an RGB-camera. In this setup, the movable infrared illumination light, such as the movable infrared light beam may be used in order to analyze regions in the RGB-picture that appear specifically important, such as moving and/or changing objects. This feature may be achieved via simple picture analysis algorithms. Thereby, a fast and simple tracking of faces, limbs or other movable and objects may be feasible.

In the context of gaming, as will be outlined in further detail below, such as in the context of game consoles and/or augmented reality applications, the detector according to the present invention, specifically having the at least one movable reflective element, provides additional advantages. Thus, current image sensors are generally incapable of analyzing the distance of objects in space. Consequently, these types of sensors generally are limited in their interpretation of the augmented reality information. Thus, commercially available image sensors and detectors generally are incapable of analyzing depth information. These sensors or detectors are capable of detecting a 2D position. However, since no depth information of objects such as hands, feet or other body parts are available, the augmented reality generally is influenced by the 2D-image, only. Contrarily, in the context of the present invention, a tracking of objects in space becomes feasible, specifically in the context of machine control, gaming or augmented reality. Still, as outlined above, the invention may be performed by using standard computational resources or, generally, low computational resources.

The detector further may comprise at least one beam-splitting device, wherein the beam splitting device may be adapted to separate the illumination light emitted by the illumination source before passing the longitudinal optical sensor from the light beam traveling from the object to the detector after passing the longitudinal optical sensor. As used here, a beam splitting device is a device adapted to split the light beam emitted by the illumination device into two or more light beams and to deflect the light beam in the direction of the optical axis, in particular parallel to the direction of the optical axis. The beam splitting device may be selected from the group consisting of: a semitransparent mirror; a mirror or semi-transparent mirror reflecting only specific spectral regions, such as light in the infrared spectral range; a prism; a dichroitic mirror; a beam splitter cube.

As outlined above, the at least one optional beam-splitting device may fully or partially be identical with the at least one optional reflective element. Thus, as outlined above, the beam-splitting device may be or may comprise at least one movable reflective element adapted to be adjusted to at least two different positions, wherein, in the at least two different positions, the illumination light is reflected into different directions. Specifically, the at least one beam-splitting device may be or may comprise at least one infrared reflective element, more specifically at least one movable infrared reflective element.

Therein, the position and/or orientation of the at least one light beam traveling from the object to the detector after passing the longitudinal optical sensor may be kept at least substantially unchanged when passing the at least one reflective element, specifically when passing the at least one movable reflective element. Thus, specifically, the at least one movable reflective element may be adapted such that, when moving the movable reflective element, a position and/or orientation of the illumination light is changed by the movement of the movable reflective element, whereas a position and/or orientation of the light beam may be kept at least substantially independent from the movement of the movable reflective element.

The longitudinal sensor signals may further be dependent on a modulation frequency of the light beam. In particular, the FiP-effect may depend on or may be emphasized by an appropriate modulation of the light beam, as disclosed in WO 2012/110924 A1. Specifically in case the longitudinal optical sensors provide the above-mentioned FiP-effect, the sensor signal of the longitudinal optical sensor may be dependent on a modulation frequency of the light beam. As an example, the FiP-effect may be used with modulation frequencies of 0.1 Hz to 10 kHz.

The illumination source may be adapted to periodically modulate at least one optical property of the illumination light. Thus, the illumination source may be adapted to emit the light beam in a modulated way and/or an additional modulation device, which may be adapted to periodically modulate at least one optical property of the illumination light, may be used. Additionally or alternatively, the detector may comprise at least one modulation device for periodically modulating at least one optical property of the illumination light. For example, the at least one optical property may be selected from the group consisting of an amplitude and a phase of the illumination light. The modulation device, as an example, may comprise a spatial light modulator, preferably a micro-mirror device and more preferably a DLP® device. Other modulation devices may be used. The modulation may be used for one or more different purposes, such as for enhancing and/or enabling the FiP-effect and/or for identifying one or more illumination sources emitting at a specific modulation frequency. The latter purpose may be used for distinguishing between two or more different modulated light beams at different modulation frequencies. For further details, reference may be made to WO 2014/198626 A1.

The illumination source may be adapted to send out at least two light beams having differing optical properties. For example, the at least two light beams may have a differing spectral property. For example, the spectral property of the light beams may be a color and/or a polarization of the portion of the light beam. Preferably, the at least two light beams are modulated with different modulation frequencies.

The longitudinal sensor signals may be further dependent on a modulation frequency of the light beam. The evaluation device preferably may be adapted for performing the frequency analysis by demodulating the longitudinal sensor signal with different modulation frequencies. The modulation of the light beams sent out by the illumination source and the demodulation of the longitudinal sensor signals by the evaluation device preferably take place with the same set of modulation frequencies. For this purpose, the evaluation device may contain one or more demodulation devices, such as one or more frequency mixing devices, one or more frequency filters such as one or more low-pass filters or one or more lock-in amplifiers and/or Fourier-analyzers. The evaluation device preferably may be adapted to perform a discrete or continuous Fourier analysis over a predetermined and/or adjustable range of frequencies.

The evaluation device may comprise one or more electronic components, such as one or more frequency mixing devices and/or one or more filters, such as one or more band-pass filters and/or one or more low-pass filters. Thus, as an example, the evaluation device may comprise at least one lock-in amplifier or, preferably, a set of lock-in amplifiers, for performing the frequency analysis. Thus, as an example, in case a set of modulation frequencies is provided, the evaluation device may comprise a separate lock-in amplifier for each modulation frequency of the set of modulation frequencies or may comprise one or more lock-in amplifiers adapted for performing a frequency analysis for two or more of the modulation frequencies, such as sequentially or simultaneously. Lock-in amplifiers of this type generally are known in the art.

The evaluation device may be designed to generate the at least one item of information on the longitudinal position of the object from at least one predefined relationship between the geometry of the illumination of the sensor region by the light beam and a relative positioning of the object with respect to the detector. The predefined relationship between the geometry of the illumination of the sensor region by the light beam and the relative positioning of the object with respect to the detector may take account of a known power of the illumination. The known relationship may be stored in the evaluation device as an algorithm and/or as one or more calibration curves. As an example, specifically for Gaussian beams, a relationship between a beam diameter or a beam waist and a position of the object may easily be derived by using the Gaussian relationship between the beam waist and a longitudinal coordinate. The predefined relationship between the geometry of the illumination of the sensor region by the light beam and the relative positioning of the object with respect to the detector may take account of a modulation frequency with which the illumination is modulated.

In a further aspect of the present invention, a detector system for determining a position of at least one object is disclosed. The detector system comprises at least one detector according to present invention, such as according to one or more of the embodiments disclosed above or disclosed in further detail below. The detector system further comprises at least one beacon device adapted to direct at least one light beam towards the detector. The beacon device is at least one of attachable to the object, holdable by the object and integratable into the object.

In a further aspect of the present invention, a human-machine interface for exchanging at least one item of information between a user and a machine is disclosed. The human-machine interface comprises at least one detector according to the present invention, such as according to one or more of the embodiments disclosed above or disclosed in further detail below. The human-machine interface is designed to generate at least one item of geometrical information of the user by means of the detector. The human-machine interface is designed to assign to the geometrical information at least one item of information, in particular at least one control command.

As used herein, the term "human-machine interface" generally refers to an arbitrary device or combination of devices adapted for exchanging at least one item of information, specifically at least one item of electronic information, between a user and a machine such as a machine having at least one data processing device. The generation of the item of information may be effected by a body posture and/or a movement of a user. The exchange of information may be performed in a unidirectional fashion and/or in a bidirectional fashion. Specifically, the human-machine interface may be adapted to allow for a user to provide one or more commands to the machine in a machine-readable fashion.

In a further aspect of the invention, an entertainment device for carrying out at least one entertainment function is disclosed. The entertainment device comprises at least one human-machine interface according to the present invention, such as disclosed in one or more of the embodiments disclosed above or disclosed in further detail below. The entertainment device is designed to enable at least one item of information to be input by player, i.e. a user using the entertainment device for entertainment purposes, by means of the human-machine interface, wherein the entertainment device is designed to vary the entertainment function in accordance with the information.

As used herein, an "entertainment device" is a device which may serve the purpose of leisure and/or entertainment of one or more users, in the following also referred to as one or more players. As an example, the entertainment device may serve the purpose of gaming, preferably computer gaming. Additionally or alternatively, the entertainment device may also be used for other purposes, such as for exercising, sports, physical therapy or motion tracking in general. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device.

The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

In a further aspect of the present invention, a tracking system for tracking a position of at least one movable object is disclosed. The tracking system comprises at least one detector according to the present invention, such as disclosed in one or more of the embodiments given above or given in further detail below. The tracking system further comprises at least one track controller, wherein the track controller is adapted to track a series of positions of the object at specific points in time. For example the series of positions of the object may be tracked by recording groups of data or data pairs, each group of data or data pair comprising at least one position information and at least one time information. The track controller may be adapted to determine from the series of positions a movement of the object.

As used herein, a "tracking system" is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action.

Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The tracking system specifically may be part of a local or global positioning system. Additionally or alternatively, the tracking system may be part of a visible light communication system. Other uses are feasible.

In a further aspect of the present invention, a camera for imaging at least one object is disclosed. The camera comprises at least one detector according to the present invention, such as disclosed in one or more of the embodiments given above or given in further detail below.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term "photography" generally refers to the technology of acquiring image information of at least one object. As further used herein, a "camera" generally is a device adapted for performing photography. As further used herein, the term "digital photography" generally refers to the technology of acquiring image information of at least one object by using a plurality of light-sensitive elements adapted to generate electrical signals indicating an intensity and/or color of illumination, preferably digital electrical signals. As further used herein, the term "3D photography" generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

In a further aspect of the invention a use of the detector according to the present invention is disclosed, for a purpose of use, selected from the group consisting of: a position measurement in traffic technology; an entertainment application; a security application; a safety application; a human-machine interface application; a tracking application; a photography application; an imaging application or camera application; a mapping application for generating maps of at least one space; a use in combination with at least one time-of-flight measurement; a positioning system; a communication system; a focus length determination of at least one transfer device.

Thus, generally, the detector according to the present invention may be applied in various fields of uses. For embodiments and further uses reference is made to WO 2016/005893 A1.

In particular, the detector may be used for focus length determination of at least one transfer device. In a first step, at least one light beam may be generated by the at least one illumination source positioned at a first distance from the at least one transfer device. The illumination source may be a small illumination source, in particular a point light source. The light beam may be directed to the at least one transfer device and may impinge on the at least one transfer device. In a second step, the longitudinal sensor signal of at least one of the longitudinal optical sensors may be determined and a normalized sensor response may be determined. The longitudinal sensor signal may be normalized to its maxima. The second step may be repeated with different positions of the illumination source from the transfer device. All curves of the array of curves of normalized sensor response as a function of the position of the longitudinal sensor behind the transfer device intersect at the range or point of intersection at $b_0 = f$, wherein f is the focal length of the transfer device. The focal length of the transfer device corresponds to the point of intersection such that the focal length can be determined by determining the point of intersection.

Summarizing the above-mentioned findings, the following embodiments are preferred within the present invention:

Embodiment 1: A method for adjusting a detector for determining a position of at least one object within a range of measurement, the detector comprising at least two longitudinal optical sensors and at least one transfer device for imaging the object into an image plane, the transfer device having a focal plane, the transfer device being positioned in between the longitudinal optical sensors and the object, each of the longitudinal optical sensors having at least one sensor region, wherein each of the longitudinal optical sensors is designed to generate at least one longitudinal sensor signal in a manner dependent on an illumination of the respective sensor region by at least one light beam propagating from the object to the detector, wherein the longitudinal sensor signal, given the same total power of the illumination, is dependent on a beam cross-section of the light beam in the sensor region, the method comprising the following steps:
(i) subsequently moving the object longitudinally to at least two different calibration positions having at least two different longitudinal coordinates within the range of measurement;
(ii) recording, for each of the calibration positions, at least one first longitudinal sensor signal generated by a first longitudinal optical sensor and at least one second longitudinal sensor signal generated by a second longitudinal optical sensor;
(iii) forming, for each of the calibration positions, at least one calibration signal using the first and second longitudinal sensor signals;
(iv) generating a calibration function using the calibration signals, the calibration function defining a relationship between the longitudinal coordinate of the object and the first and second longitudinal sensor signals.

Embodiment 2: Method according to the preceding embodiment, wherein the method comprises at least one measurement step, wherein the longitudinal coordinate of the object is determined by using the calibration function.

Embodiment 3: Method according to any one of the preceding embodiments, wherein the method further comprises at least one adjustment step for positioning the first longitudinal optical sensor and the second longitudinal optical sensor, the adjustment step comprising the following substeps:
a) positioning the object in at least one outermost position within the measurement range, the outermost position of having a maximum longitudinal coordinate;
b) positioning the first longitudinal optical sensor at a longitudinal coordinate of the focused image plane;
c) positioning the object in at least one closest position within the measurement range, the closest position of having a minimum longitudinal coordinate; and
d) positioning the second longitudinal optical sensor at a longitudinal coordinate of the focused image plane.

Embodiment 4: Method according to the preceding embodiment, wherein the adjustment step is performed before method step (i).

Embodiment 5: Method according to any one of the preceding embodiments, wherein the method further comprises at least one positioning step for positioning the first longitudinal optical sensor and the second longitudinal optical sensor, the positioning step comprising the following substeps:
A) positioning the object in the at least one outermost position within the measurement range, the outermost position of having the maximum longitudinal coordinate, and positioning the first longitudinal optical sensor at a longitudinal position in between the transfer device and the focal plane of the transfer device; and
B) positioning the second longitudinal optical sensor at a longitudinal coordinate of a focused image plane.

Embodiment 6: Method according to the preceding embodiment, wherein step A) comprises the following substeps:
A1) defining a sensor threshold for the first longitudinal sensor signal;
A2) moving the first longitudinal optical sensor towards the focal plane and comparing the first longitudinal sensor signal with the sensor threshold; and
A3) positioning the first longitudinal optical sensor at a position at which the first longitudinal sensor signal equals the sensor threshold.

Embodiment 7: Method according to any one of the two preceding embodiments, wherein the positioning step is performed before method step (i).

Embodiment 8: A detector for determining a position of at least one object, comprising:
- at least one transfer device for imaging the object into an image plane, the transfer device having a focal plane,
- at least two longitudinal optical sensors, wherein each of the longitudinal optical sensors has at least one sensor region, wherein each of the longitudinal optical sensors is designed to generate at least one longitudinal sensor signal in a manner dependent on an illumination of the sensor region by at least one light beam propagating from the object to the detector, wherein the longitudinal sensor signal, given the same total power of the illumination, is dependent on a beam cross-section of the light beam in the sensor region;
- at least one evaluation device, wherein the detector is adapted to move the object subsequently to at least two different calibration positions having at least two different longitudinal coordinates within a range of measurement, wherein the evaluation device is adapted to record, for each of the calibration positions, at least one first longitudinal sensor signal generated by a first longitudinal optical sensor and at least one second longitudinal sensor signal generated by a second longitudinal optical sensor, wherein the evaluation device is adapted to form, for each of the calibration positions, at least one calibration signal using the first and second longitudinal sensor signals, wherein the evaluation device is designed to generate a calibration function using the calibration signals the calibration function defining a relationship between the longitudinal coordinate of the object and the first and second longitudinal sensor signals.

Embodiment 9: The detector according to the preceding embodiment, wherein the evaluation device is designed to generate at least one item of information on a longitudinal position of the object by evaluating at least one of the longitudinal sensor signals.

Embodiment 10: The detector according to any one of the preceding embodiments referring to a detector, wherein the detector is adapted to perform at least one adjustment step for positioning the first longitudinal optical sensor and the second longitudinal optical sensor, the adjustment step comprising the following substeps:
a) positioning the object in at least one outermost position within the measurement range, the outermost position of having a maximum longitudinal coordinate;
b) positioning the first longitudinal optical sensor at a longitudinal coordinate of the focused image plane;
c) positioning the object in at least one closest position within the measurement range, the closest position of having a minimum longitudinal coordinate; and
d) positioning the second longitudinal optical sensor at a longitudinal coordinate of the focused image plane.

Embodiment 11: The detector according to any one of the preceding embodiments referring to a detector, wherein the detector is adapted to perform at least one positioning step for positioning the first longitudinal optical sensor and the second longitudinal optical sensor, the positioning step comprising the following substeps:
A) positioning the first longitudinal optical sensor at a longitudinal position in between the transfer device and a focal plane of the transfer device; and
B) positioning the second longitudinal optical sensor at a longitudinal coordinate of a focused image plane.

Embodiment 12: The detector according to the preceding embodiment, wherein step A) comprises the following substeps:
A1) defining a sensor threshold for the first longitudinal sensor signal;
A2) moving the first longitudinal optical sensor towards the focal plane and comparing the first longitudinal sensor signal with the sensor threshold; and
A3) positioning the first longitudinal optical sensor at a position at which the first longitudinal sensor signal equals the sensor threshold.

Embodiment 13: The detector according to any one of the preceding embodiments referring to a detector, wherein at least one of the longitudinal optical sensors is at least partially transparent.

Embodiment 14: The detector according to the preceding embodiment, wherein the detector comprises at least one imaging device, wherein the detector is adapted to image the object through the longitudinal optical sensors.

Embodiment 15: The detector according to any one of the preceding embodiments referring to a detector, wherein the detector comprises a stack of longitudinal optical sensors.

Embodiment 16: The detector according to the preceding embodiment, wherein the first and second longitudinal optical sensors form part of the stack of longitudinal optical sensors.

Embodiment 17: A detector system for determining a position of at least one object, the detector system comprising at least one detector according to any one of the preceding embodiments referring to a detector, the detector system further comprising at least one beacon device adapted to direct at least one light beam towards the detector, wherein the beacon device is at least one of attachable to the object, holdable by the object and integratable into the object.

Embodiment 18: A human-machine interface for exchanging at least one item of information between a user and a machine, wherein the human-machine interface comprises at least one detector according to any one of the preceding embodiments, wherein the human-machine interface is designed to generate at least one item of geometrical information of the user by means of the detector, wherein the human-machine interface is designed to assign to the geometrical information at least one item of information, in particular at least one control command.

Embodiment 19: An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 20: A tracking system for tracking the position of at least one movable object, the tracking system comprising a detector according to any one of the preceding embodiments relating to a detector, the tracking system further comprising at least one track controller, wherein the track controller is adapted to track a series of positions of the object at specific points in time.

Embodiment 21: A camera for imaging at least one object, the camera comprising at least one detector according to any one of the preceding embodiments referring to a detector.

Embodiment 22: A use of the detector according to any one of the preceding embodiments relating to a detector, for a purpose of use, selected from the group consisting of: a position measurement in traffic technology; an entertainment application; a security application; a safety application; a human-machine interface application; a tracking application; a photography application; an imaging application or camera application; a mapping application for generating maps of at least one space; a use in combination with at least one time-of-flight measurement; a positioning system; a communication system; a focus length determination of at least one transfer device.

BRIEF DESCRIPTION OF THE FIGURES

Further optional details and features of the invention are evident from the description of preferred exemplary embodiments which follows in conjunction with the dependent claims. In this context, the particular features may be implemented alone or in any reasonable combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

In the figures.

EXEMPLARY EMBODIMENTS

Figure 1:
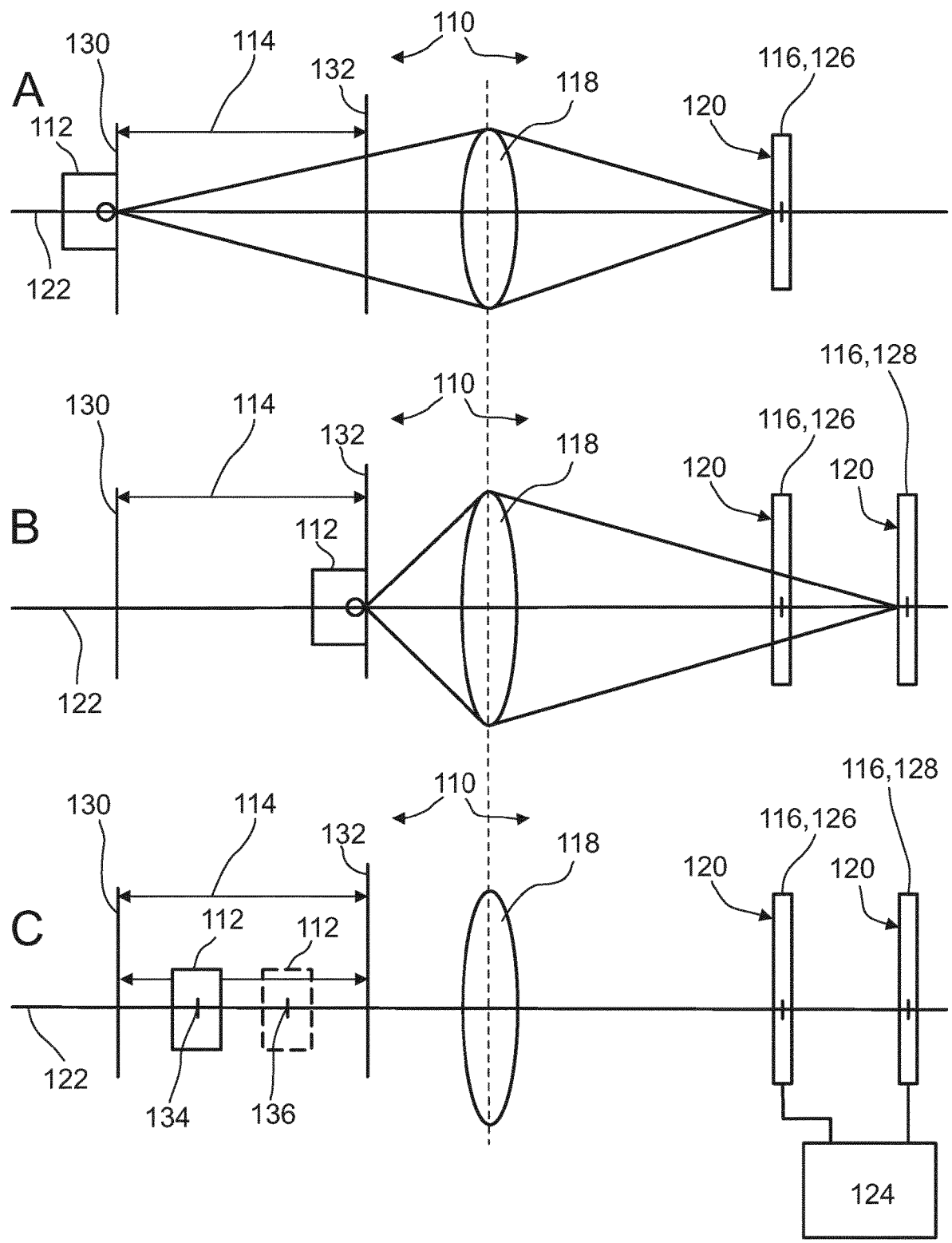
FIGS. 1A to 1C show an exemplary embodiment of method according to the present invention.

In FIG. 1A to 1C an exemplary embodiment of the method for adjusting a detector 110 for determining a position of at least one object 112 within a range of measurement 114 according to the present invention is shown. The detector 110 comprises at least two longitudinal optical sensors 116 and at least one transfer device 118 for imaging the object 112 into an image plane. The transfer device 118 has a focal plane. The transfer device 118 is positioned in between the longitudinal optical sensors 116 and the object 112. The transfer device 118 may comprise at least one element selected from the group consisting of: a lens, in particular a focusing and/or a defocusing lens; a focusing mirror; a defocusing mirror.

Each of the longitudinal optical sensors 116 has at least one sensor region 120. Each of the longitudinal optical sensors 116 is designed to generate at least one longitudinal sensor signal in a manner dependent on an illumination of the respective sensor region 120 by at least one light beam propagating from the object 112 to the detector 110. The longitudinal sensor signal, given the same total power of the illumination, is dependent on a beam cross-section of the light beam in the sensor region 120. For potential setups of the longitudinal optical sensors, reference may be made to WO 2012/110924 A1 and/or WO2014/097181 A1 and/or WO 2016/005893 A1. Still, other embodiments are feasible. The longitudinal optical sensors 116 may be arranged in a stack.

At least one of the longitudinal optical sensors 116 may be at least partially transparent. Thus, generally, the longitudinal optical sensors 116 may comprise at least one at least partially transparent optical sensor such that the light beam at least partially may pass through the longitudinal optical sensor 116. Thus, as an example, the transparent longitudinal optical sensor may have a transparency of at least 10%, preferably at least 20%, at least 40%, at least 50% or at least 70%. In order to provide a sensory effect, generally, the longitudinal optical sensor typically has to provide some sort of interaction between the light beam and the longitudinal optical sensor which typically results in a loss of transparency. The transparency of the longitudinal optical sensor may be dependent on a wavelength of the light beam, resulting in a spectral profile of a sensitivity, an absorption or a transparency of the longitudinal optical sensor. Preferably all longitudinal optical sensors of the plurality and/or the stack are transparent.

The transfer device 118 may comprise at least one optical axis 122. The transfer device 118 may be positioned such that light originating from the object 112, firstly, is transferred by the transfer device 118 and subsequently impinges on the longitudinal optical sensors 116. The object 112, longitudinal optical sensors 116 and the transfer device 118 may be arranged on the optical axis 122 such that the transfer device 118 is positioned in between the longitudinal optical sensors 116 and the object 112. However, embodiments are feasible wherein the transfer device 118 and the longitudinal optical sensors 116 are arranged in different beam paths.

The detector 110 further comprises at least one evaluation device 124.

In the embodiment shown in FIG. 1A to C, the method comprises at least one adjustment step for positioning at least one first longitudinal optical sensor 126 and at least one second longitudinal optical sensor 128. The adjustment step may comprise the following substeps:

a) positioning the object 112 in at least one outermost position 130 within the measurement range 114, the outermost position 130 of having a maximum longitudinal coordinate;

b) positioning the first longitudinal optical sensor 126 at a longitudinal coordinate of the focused image plane 139;

c) positioning the object 112 in at least one closest position 132 within the measurement range 114, the closest position of having a minimum longitudinal coordinate; and d) positioning the second longitudinal optical sensor 128 at a longitudinal coordinate of the focused image plane 139.

In particular, in step b), the first longitudinal optical sensor 126 may be positioned such that at least one first longitudinal sensor signal generated by the first longitudinal optical sensor 126 is maximized. In particular, in step d), the second longitudinal optical sensor 128 may be positioned such that least one second longitudinal sensor signal generated by the second longitudinal optical sensor 128 is maximized in case of positive FiP effect or minimized in case of negative FiP effect.

Substeps a) and b) are shown in FIG. 1A. Substeps c) and d) are depicted in FIG. 1B. The substeps may be performed in the given order or in a different order. Further, two or more or even all of the method steps may be performed simultaneously and/or overlapping in time. Further, one, two or more or even all of the method steps may be performed repeatedly. The method may further comprise additional method steps. The adjustment step may be performed before method step (i).

The first longitudinal sensor signal may exhibit a global maximum for this object distance and luminance at a longitudinal coordinate of the focal plane at which collected light originating from the object 112 in the outermost position 130 is focused by the transfer device 118. For example, the first longitudinal sensor signal may be maximized by, firstly, positioning the first longitudinal optical sensor 126 at an arbitrary distance to the transfer device 118, in particular to a site of the transfer device 118 opposite to the object 112, and, subsequently, by moving the first longitudinal optical sensor 126 stepwise or continuously longitudinally away from or toward the transfer device 118.

The closest position 132 may be defined by design of the transfer device, in particular of a longitudinal extension. The second longitudinal sensor signal may exhibit the maximum for this object distance and radiant power at a longitudinal coordinate of the focal plane at which collected light originating from the object 112 in the closest position 132 is focused by the transfer device 118. For example, the second longitudinal sensor signal may be maximized by, firstly, positioning the second longitudinal optical sensor 128 at an arbitrary distance to the first longitudinal optical sensor 126, in particular to a site of the first longitudinal optical sensor 126 opposite to the transfer device 118 such that the first longitudinal optical sensor 126 is positioned in between the transfer device 118 and the second longitudinal optical sensor 128, and, subsequently, by moving the second longitudinal optical sensor 128 stepwise or continuously longitudinally away from or to the first longitudinal optical sensor 126.

The adjusted positions of the first longitudinal optical sensor 126 and second longitudinal optical sensor 128 may differ. The adjusted position of the first longitudinal optical sensor 126 may be closer to the transfer device 118 than the adjusted position of the second longitudinal optical sensor 128. Adjusting the position of the first longitudinal optical sensor 126 and the second longitudinal optical sensor 128 using the proposed method allows that change of quotient over the measurement range is maximized. This allows best resolution to distinguish different longitudinal coordinates of the object 118.

As shown in FIG. 1C, the method comprises the following steps:

(i) subsequently moving the object 112 longitudinally to at least two different calibration positions 134, 136 having at least two different longitudinal coordinates within the range of measurement 114;

(ii) recording, for each of the calibration positions 134, 136, at least one first longitudinal sensor signal generated by the first longitudinal optical sensor 126 and at least one second longitudinal sensor signal generated by the second longitudinal optical sensor 128;

(iii) forming, for each of the calibration positions 134, 136, at least one calibration signal using the first and second longitudinal sensor signals;

(iv) generating a calibration function using the calibration signals, the calibration function defining a relationship between the longitudinal coordinate of the object 112 and the first and second longitudinal sensor signals.

As outlined above, in method step (i), the object 112 is moved subsequently longitudinally to at least two different calibration positions 134, 136 having at least two different longitudinal coordinates within the range of measurement 114. Preferably, the object 112 may be moved through the entire measurement range 114, in particular with a predefined or selected step size. The evaluation device 124 may be adapted to record the first and second longitudinal sensor signals. As outlined above, in method step (iii), for each of the calibration positions 134, 136, at least one calibration signal using the first and second longitudinal sensor signals is formed. The evaluation device 124 may adapted to form the calibration signals. In particular, at each position of the object 112 one of the first longitudinal sensor signal and the second longitudinal sensor signal may be divided by the other one of the first longitudinal sensor signal and the second longitudinal sensor signal. In particular, for each position of the object 112 a quotient of the first longitudinal sensor signal and the second longitudinal sensor signal may be formed. As outlined above, in method step (iv), a calibration function is generated using the calibration signals. The calibration function defines a relationship between the longitudinal coordinate of the object 112 and the first and second longitudinal sensor signals. In particular, the calibration function refers to relationship between the calibration signal and the longitudinal coordinate of the object 112. Particularly preferably, the relationship comprises at least one calibration curve, at least one set of calibration curves, at least one function or a combination of the possibilities mentioned. One or a plurality of calibration curves can be stored for example in the form of a set of values and the associated function values thereof, for example in a data storage device and/or a table. Alternatively or additionally, however, the at least one calibration curve can also be stored for example in parameterized form and/or as a functional equation. Various possibilities are conceivable and can also be combined.

The method may further comprise at least one measurement step, not shown here. In the measurement step the longitudinal coordinate of the object 112 and/or another object may be determined within the measurement range. In particular, the longitudinal coordinate of the object 112 may be determined by recording the first sensor signal and the second sensor signal for this position of the object 112 and by forming the combined sensor signal, in particular a quotient. The longitudinal coordinate may be determined by using the calibration function. Preferably, the measurement step may be performed after performing method steps i) to iv).

Figure 2:
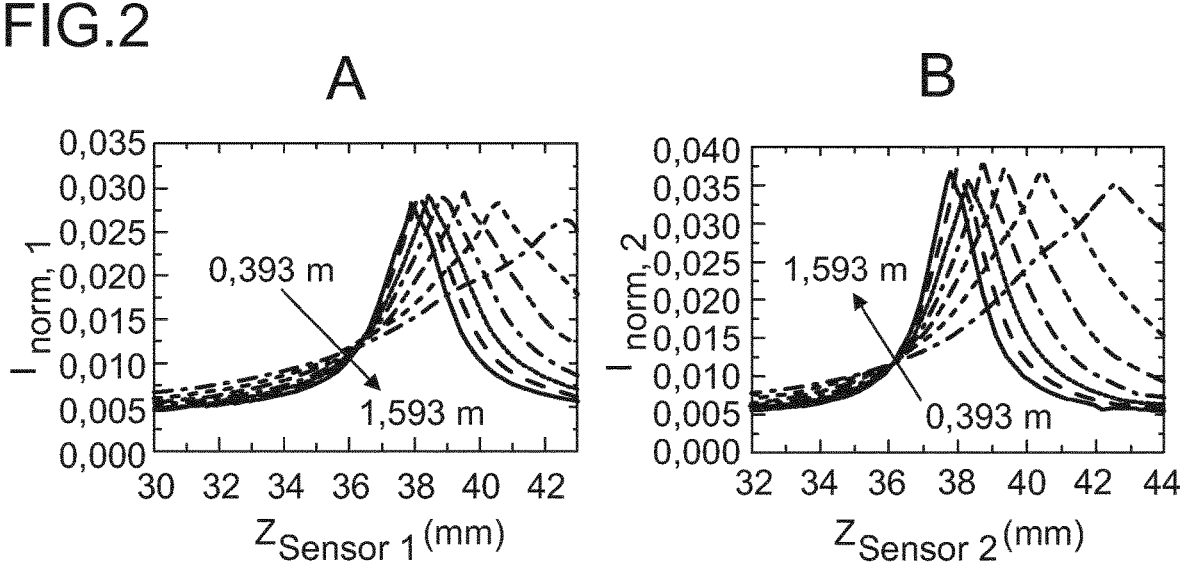
FIGS. 2A and 2B show normalized photocurrent as a function of distance between first longitudinal optical sensor (FIG. 2A) and transfer device and second longitudinal optical sensor (FIG. 2B) and the transfer device.

FIGS. 2A and 2B show experimental results. As object 112 a 530 nm LED having a modulation frequency of 475 Hz was used. As transfer device 118 a camera lens from Nikkor 50 mm f1/1.2 focused at infinity was used. As first and second longitudinal optical sensors a sDSC was used. The distance from the object 112 from the transfer device 118 was varied at 0,2 m steps between 0.393 m and 1.593 m. For each object distance, a longitudinal signal curve was recorded by moving the first longitudinal optical sensor 126 and second longitudinal optical sensor 128 with a step size of 500 μm. FIG. 2A shows an array of curves of normalized photocurrent $I_{norm,1}$ as a function of distance $z_{sensor,1}$ between the first longitudinal optical sensor 126 and transfer device 118. The curves are normalized to their maxima. Arrow shown in FIG. 2A denotes distance from the object 112 from the transfer device 118 of the respective longitudinal senor curve of the array of curves. The FIG. 2B shows an array of curves of normalized photocurrent $I_{norm,2}$ as a function of distance $z_{sensor,2}$ between the second longitudinal optical sensor 128 and the transfer device 118. The curves are normalized to their maxima. Arrow shown in FIG. 2B denotes distance from the object 112 from the transfer device 118 of the respective longitudinal senor curve of the array of curves.

Figure 3:
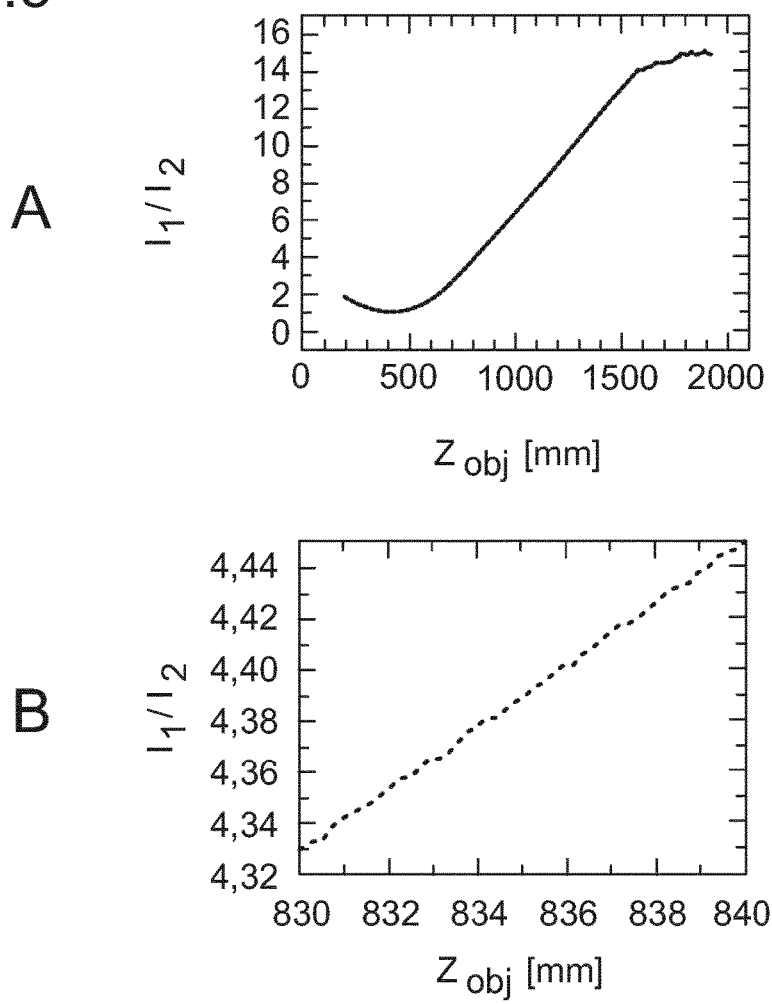
FIGS. 3A and 3B show quotient of first longitudinal sensor signal and second longitudinal sensor signal as a function of object distance.

FIGS. 3A and 3B show experimental results of determination of quotient of first longitudinal sensor signal $I_1$ and second longitudinal sensor signal $1_2$ as a function of object distance $z_{obj}$ in mm. FIG. 3A shows a range of object distance from 0 to 2000 mm, whereas FIG. 3B shows zoomed details. Actual measuring points are demonstrated showing possibility for sub-mm resolution. A 530 nm LED having a modulation frequency of 375 Hz was used. As transfer device 118 a camera lens from Nikkor 50 mm f1/1.2 focused at infinity was used. As first and second longitudinal optical sensors a sDSC was used. The first longitudinal optical sensor 126 was placed at a distance of 38 mm from the transfer device 118 and the second longitudinal optical sensor 128 was placed at a distance of 43 mm from the transfer device 118. The quotient between an object distance of 500 mmm and 1500 mm can be used for accurate distance determination. Within this range the quotient changes from ~1 to ~14.

Figure 4:
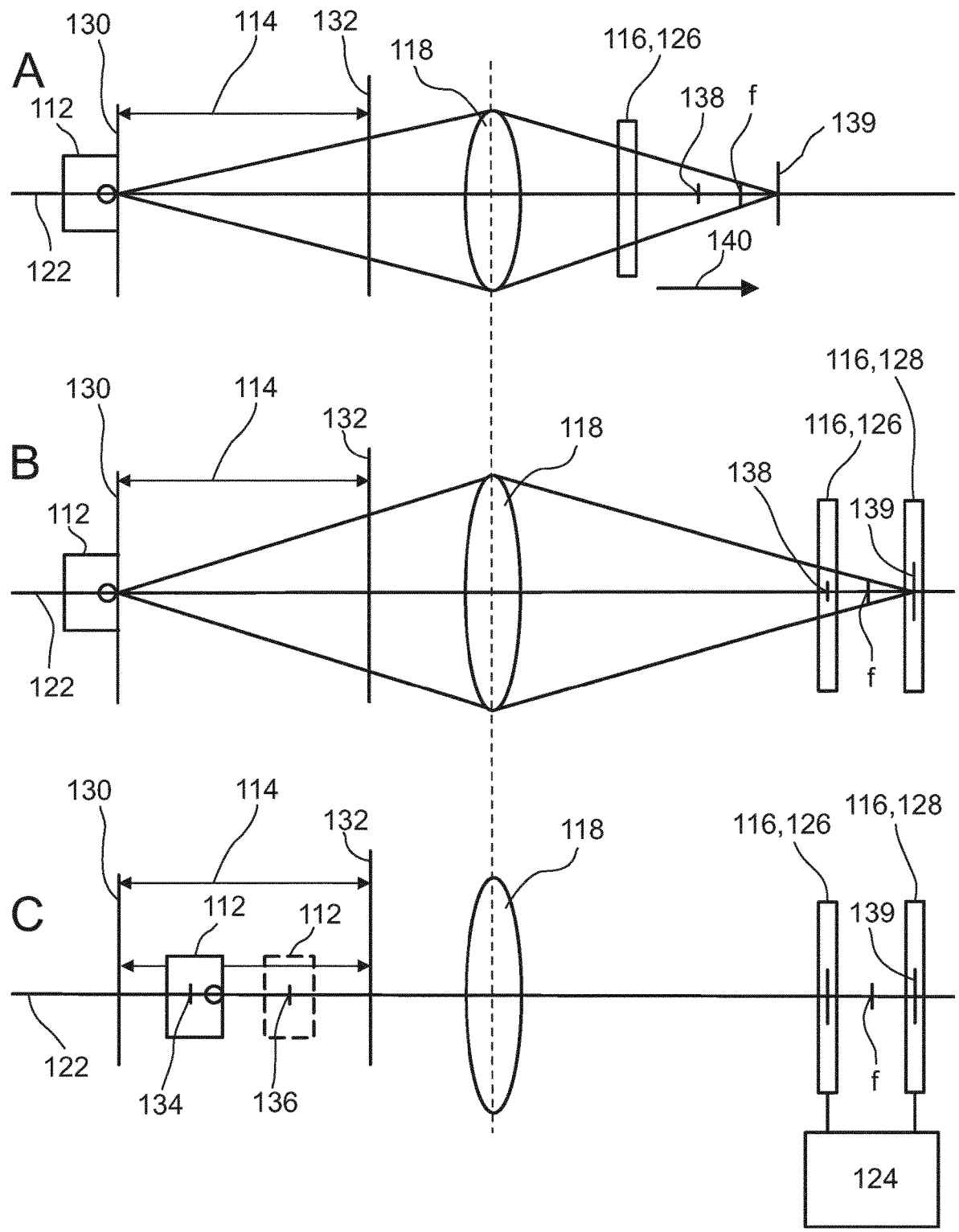
FIGS. 4A to 4C show a further exemplary embodiment of the method according to the present invention.

FIGS. 4A to 4C show a further exemplary embodiment of the method according to the present invention. In this embodiment, the method further may comprise at least one positioning step for positioning the first longitudinal optical sensor 126 and the second longitudinal optical sensor 128. The positioning step may comprise the following substeps:

A) positioning the object 112 in the at least one outermost position 130 within the measurement range 114, the outermost position 130 of having the maximum longitudinal coordinate, and positioning the first longitudinal optical sensor 126 at a longitudinal position in between the transfer device 118 and the focal plane of the transfer device 118;

A1) defining a sensor threshold for the first longitudinal sensor signal;

A2) moving the first longitudinal optical sensor 126 towards the focal plane and comparing the first longitudinal sensor signal with the sensor threshold;

A3) positioning the first longitudinal optical sensor 126 at a position 138 at which the first longitudinal sensor signal equals the sensor threshold; and B) positioning the second longitudinal optical sensor 128 at a longitudinal coordinate of a focused image plane 139.

The substeps may be performed in the given order or in a different order. Further, two or more or even all of the method steps may be performed simultaneously and/or overlapping in time. Further, one, two or more or even all of the method steps may be performed repeatedly. The method may further comprise additional method steps. Preferably, the positioning step may be performed before method step (i).

Substeps A) to A2) are shown in FIG. 4A. Preferably, the first longitudinal optical sensor 126 may be positioned in between the transfer device 118 and a point or range, wherein all normalized signals of the first longitudinal optical sensor intersect. With respect to the point or range of intersection reference is made to WO 2016/005893 A1. Although, the first longitudinal optical sensor 126 may be positioned in an arbitrary position between the transfer device 118 and the intersection point of normalized longitudinal optical sensor current, the first longitudinal optical sensor 126 may be preferably placed sufficiently far from the transfer device 118 in order to generate a longitudinal sensor signal distinguishable from a response of a noise-image. The sensor threshold may be defined such that the first longitudinal sensor signal can be used for distance measurements, in particular that the measurement signal is distinguishable from the noise-image and/or baseline. The first longitudinal optical sensor 126 is positioned at the position 138 at which the first longitudinal sensor signal equals the sensor threshold. However, preferably, change of the sensor signal may be in a range from 2× to 1000× noise value, more preferably in a range from 5× to 100× noise value and most preferably below 100× noise value. In particular, the first longitudinal optical sensor may be positioned at the position 138 at which the first longitudinal sensor signal equals the sensor threshold within tolerances of ±10%, preferably ±5%, more preferably ±1%. Movement of first longitudinal optical sensor 126 is depicted by arrow 140.

Substeps A3) and B) are shown in FIG. 4B. In particular, the second longitudinal sensor 128 may be positioned at the focused image plane 139. The object 112 may still be positioned at the outermost position. The longitudinal coordinate of the focused image plane 139 may be different from the longitudinal coordinate corresponding to focal plane at f. In particular, the second longitudinal optical sensor 128 may be positioned at the focused image plane, in particular at position different from the focal plane. In particular, a distance between transfer device 118 and the focused image plane 139 may be greater than a distance between transfer device 118 and longitudinal coordinate corresponding to the focal length f of the transfer device 118. In particular, the longitudinal coordinate corresponding to the focal length f may be in between the transfer device 118 and the focused image plane 139. Preferably, the first longitudinal optical sensor 126 may be positioned in between the transfer device 118 and the point or range of intersection, which coincides or is very close to f. For example, the first longitudinal optical sensor 126 and the second longitudinal optical sensor 128 may be arranged such that the point or range of intersection is located between the first longitudinal optical sensor 126 and the second longitudinal optical sensor 128. However, distance from the point or range of intersection to the first longitudinal optical sensor 126 and distance from the point or range of intersection to the second longitudinal optical sensor 128 may be different.

Furthermore, in the embodiment shown in FIGS. 4A to 4C, the method comprises the following steps, depicted in FIG. 4C:

(i) subsequently moving the object 112 longitudinally to the at least two different calibration positions 134, 136 having at least two different longitudinal coordinates within the range of measurement 114;

(ii) recording, for each of the calibration positions 134, 136, the at least one first longitudinal sensor signal generated by the first longitudinal optical sensor 126 and the at least one second longitudinal sensor signal generated by the second longitudinal optical sensor 128;

(iii) forming, for each of the calibration positions 134, 136, the at least one calibration signal using the first and second longitudinal sensor signals;

(iv) generating the calibration function using the calibration signals, the calibration function defining a relationship between the longitudinal coordinate of the object 112 and the first and second longitudinal sensor signals.

Figure 5:
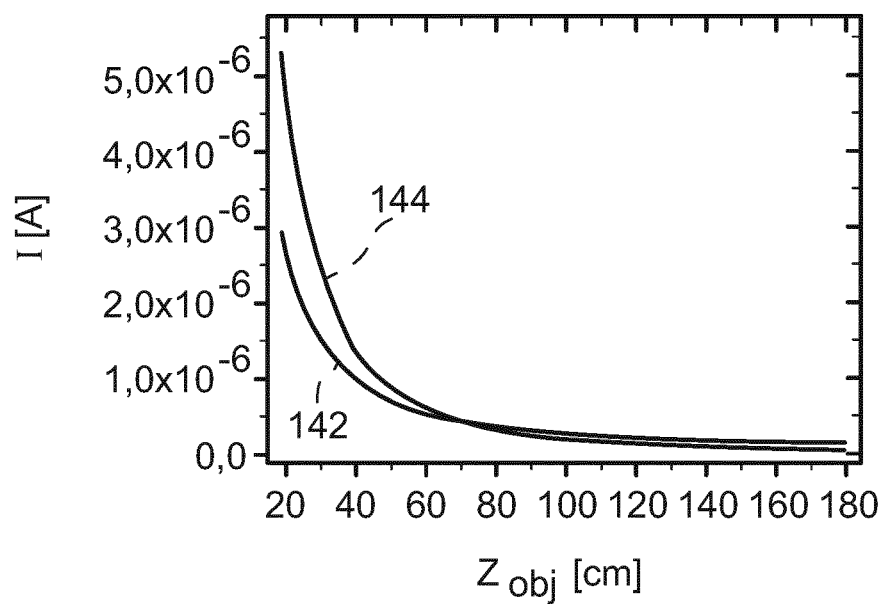
FIGS. 5A and 5B show first and second longitudinal sensor signals as a function of object distance and quotient of first longitudinal sensor signal and second longitudinal sensor signal as a function of object distance.
Figure 5:
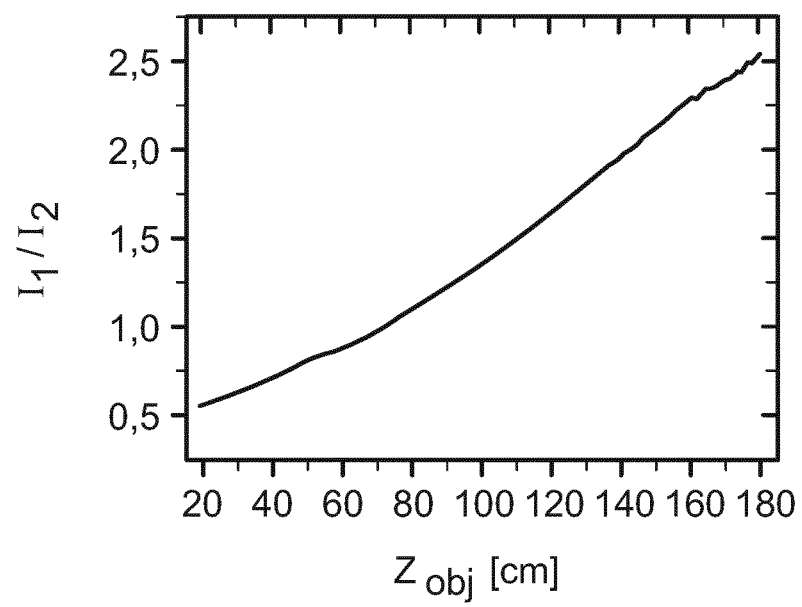

FIGS. 5A and 5B show further experimental results. A 530 nm LED having a modulation frequency of 475 Hz was used. As transfer device 118 a camera lens from Nikkor 50 mm f1/1.2 focused at infinity was used. As first and second longitudinal optical sensors a sDSC was used. The first longitudinal optical sensor 126 was placed at a distance of 33.2 mm from the transfer device 118 and the second longitudinal optical sensor 128 was placed at a distance of 38.2 mm from the transfer device 118. The object distance was varied in a step size of 0.01 m. In FIG. 5A determined photocurrent I in A of first longitudinal sensor signal, curve 142, and second longitudinal sensor signal, curve 144, as a function of object distance $z_{obj}$ in cm is shown. In FIG. 5B determined quotient of first longitudinal sensor signal $I_1$ and second longitudinal sensor signal $1_2$ as a function of object distance $z_{obj}$ in cm is shown. Between 0.2 m to 1.80 m the quotient changes between ~0.5 and ~2.5. The quotient does not level off or change slope within the measurement range. A monotonous increase in quotient is observed. Thus, measurement of object distance within a wide measurement range is possible.

Figure 6:
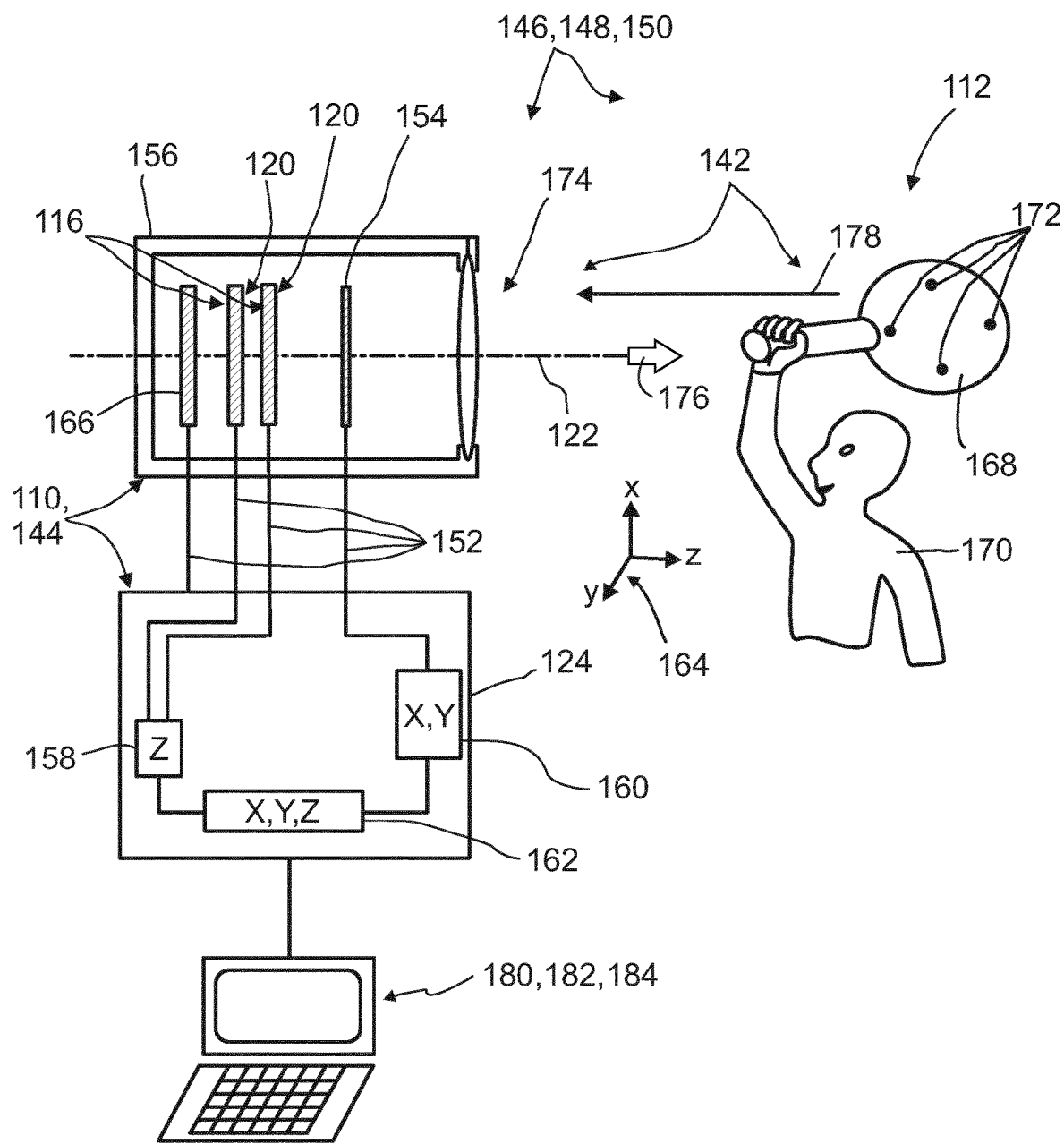
FIG. 6 shows an exemplary embodiment of a detector, detector system, human-machine interface, tracking system and camera.

FIG. 6 shows an exemplary embodiment of a detector system 142, comprising at least one detector 110. Herein, the detector 110 may be employed as a camera 144, specifically for 3D imaging, which may be made for acquiring images and/or image sequences, such as digital video clips. Further, FIG. 6 shows an exemplary embodiment of a human-machine interface 146, which comprises the at least one detector 110 and/or the at least one detector system 142, and, further, an exemplary embodiment of an entertainment device 148 comprising the human-machine interface 146. FIG. 6 further shows an embodiment of a tracking system 150 adapted for tracking a position of at least one object 112, which comprises the detector 110 and/or the detector system 142.

With regard to the detector 110 and to the detector system 142, reference may be made to the full disclosure of this application. Basically, all potential embodiments of the detector 110 may also be embodied in the embodiment shown in FIG. 6. The evaluation device 124 may be connected to each of the at least two longitudinal optical sensors 116, in particular, by the signal leads 152. By way of example, the signal leads 152 may be provided and/or one or more interfaces, which may be wireless interfaces and/or wire-bound interfaces. Further, the signal leads 152 may comprise one or more drivers and/or one or more measurement devices for generating sensor signals and/or for modifying sensor signals.

As described above, the detector 110 may comprise at least two longitudinal optical sensors 116, particularly in combination with one or more transversal optical sensors 154. As an example, one or more at least partially transparent transversal optical sensors 154 may be located on a side of the stack of longitudinal optical sensors 116 facing towards the object 112. Alternatively or additionally, one or more transversal optical sensors 154 may be located on a side of the stack of longitudinal optical sensors 116 facing away from the object 112. In this case the last of the transversal optical sensors 154 may be intransparent. Thus, in a case in which determining the x- and/or y-coordinate of the object in addition to the z-coordinate may be desired, it may be advantageous to employ, in addition to the at one longitudinal optical sensor 116 at least one transversal optical sensor 154 which may provide at least one transversal sensor signal. For potential embodiments of the transversal optical sensor, reference may be made to WO 2014/097181 A1. The at least one optional transversal optical sensor 154 may further be connected to the evaluation device 124, in particular, by the signal leads 152.

Further, the at least one transfer device 118 may be provided. The detector 110 may further comprise the at least one housing 156 which, as an example, may encase one or more of components 116, 154.

Further, the evaluation device 124 may fully or partially be integrated into the optical sensors 116, 154 and/or into other components of the detector 110. The evaluation device 124 may also be enclosed into housing 156 and/or into a separate housing. The evaluation device 124 may comprise one or more electronic devices and/or one or more software components, in order to evaluate the sensor signals, which are symbolically denoted by the longitudinal evaluation unit 158 (denoted by "z") and a transversal evaluation unit 160 (denoted by "xy") and. By combining results derived by these evaluation units 158, 160, a position information 162, preferably a three-dimensional position information, may be generated (denoted by "x, y, z"). An example of a coordinate system is shown with reference number 164.

Further, the detector 110 and/or to the detector system 142 may comprise an imaging device 166 which may be configured in various ways. Thus, as depicted in FIG. 6, the imaging device 166 can, for example be part of the detector 110 within the detector housing 156. Herein, the imaging device signal may be transmitted by one or more signal leads 152 to the evaluation device 124. Alternatively, the imaging device 166 may be separately located outside the detector housing 156. The imaging device 166 may be fully or partially transparent or intransparent. The imaging device 166 may be or may comprise an organic imaging device or an inorganic imaging device. Preferably, the imaging device 166 may comprise at least one matrix of pixels, wherein the matrix of pixels may particularly be selected from the group consisting of: an inorganic semiconductor sensor device such as a CCD chip and/or a CMOS chip; an organic semiconductor sensor device.

In the exemplary embodiment as shown in FIG. 6, the object 112 to be detected, as an example, may be designed as an article of sports equipment and/or may form a control element 168, the position and/or orientation of which may be manipulated by a user 170. Thus, generally, in the embodiment shown in FIG. 6 or in any other embodiment of the detector system 142, the human-machine interface 146, the entertainment device 148 or the tracking system 150, the object 112 itself may be part of the named devices and, specifically, may comprise the at least one control element 168, specifically, wherein the at least one control element 168 has one or more beacon devices 172, wherein a position and/or orientation of the control element 168 preferably may be manipulated by user 170. As an example, the object 112 may be or may comprise one or more of a bat, a racket, a club or any other article of sports equipment and/or fake sports equipment. Other types of objects 112 are possible. Further, the user 170 may be considered as the object 112, the position of which shall be detected. As an example, the user 170 may carry one or more of the beacon devices 172 attached directly or indirectly to his or her body.

The detector 110 may be adapted to determine at least one item on a longitudinal position of one or more of the beacon devices 172 and, optionally, at least one item of information regarding a transversal position thereof, and/or at least one other item of information regarding the longitudinal position of the object 112 and, optionally, at least one item of information regarding a transversal position of the object 112. Particularly, the detector 110 may be adapted for identifying colors and/or for imaging the object 112, such as different colors of the object 112, more particularly, the color of the beacon devices 172 which might comprise different colors.

The longitudinal optical sensor 116 may be arranged along the optical axis 122. Specifically, the optical axis 122 may be an axis of symmetry and/or rotation of the setup of the optical sensors 116. The longitudinal optical sensors 116 may be located inside the housing 156. An opening 174 in the housing 156, which may, particularly, be located concentrically with regard to the optical axis 122, preferably defines a direction of view 176 of the detector 110. The light beam originating from the object is denoted with reference number 178.

The detector 110 may be adapted for determining the position of the at least one object 112. Additionally, the detector 110, specifically an embodiment including the camera 144, may be adapted for acquiring at least one image of the object 112, preferably a 3D-image. As outlined above, the determination of a position of the object 112 and/or a part thereof by using the detector 110 and/or the detector system 142 may be used for providing a human-machine interface 146, in order to provide at least one item of information to a machine 180. In the embodiments schematically depicted in FIG. 6, the machine 180 may be or may comprise at least one computer and/or a computer system comprising a data processing device 182. Other embodiments are feasible. The evaluation device 124 may be a computer and/or may comprise a computer and/or may fully or partially be embodied as a separate device and/or may fully or partially be integrated into the machine 180, particularly the computer. The same holds true for a track controller 184 of the tracking system 150, which may fully or partially form a part of the evaluation device 124 and/or the machine 180.

Similarly, as outlined above, the human-machine interface 146 may form part of the entertainment device 148. Thus, by means of the user 170 functioning as the object 112 and/or by means of the user 170 handling the object 112 and/or the control element 168 functioning as the object 112, the user 170 may input at least one item of information, such as at least one control command, into the machine 180, particularly the computer, thereby varying the entertainment function, such as controlling the course of a computer game.

LIST OF REFERENCE NUMBERS 110 detector
112 object
114 range of measurement
116 longitudinal optical sensor
118 transfer device
120 sensor region
122 optical axis
124 evaluation device
126 first longitudinal optical sensor
128 second longitudinal optical sensor
130 outermost position
132 closest position
134 calibration position
136 calibration position
138 position
139 Focused image plane
140 arrow
142 detector system
144 camera
146 human-machine interface
148 entertainment device
150 tracking system
152 signal leads
154 transversal optical sensor
156 housing
158 longitudinal evaluation unit
160 transversal evaluation unit
162 position information
164 coordinate system
166 imaging
168 control element
170 User
172 beacon device
174 Opening
176 direction of view
178 light beam
180 Machine
182 data processing device
184 track controller

The invention claimed is:

1. A method of adjusting a detector, wherein the detector is suitable for determining a position of at least one object within a range of measurement, wherein the detector constitutes a coordinate system in which an optical axis forms a z-axis, a direction parallel or antiparallel to the z-axis being a longitudinal direction, and a coordinate along the z-axis being a longitudinal coordinate, the detector comprising at least two longitudinal optical sensors and at least one transfer device suitable for imaging the at least one object into an image plane, the at least one transfer device having a focal plane and being positioned between the at least two longitudinal optical sensors and the at least one object, each of the at least two longitudinal optical sensors having at least one sensor region and being designed to generate at least one longitudinal sensor signal in a manner dependent on an illumination of the respective sensor region by at least one light beam propagating from the at least one object to the detector, wherein the at least one longitudinal sensor signal, given the same total power of the illumination, is dependent on a beam cross-section of the at least one light beam in the respective sensor region, the detector further comprising at least one evaluation device, the method comprising:
(i) subsequently moving the at least one object longitudinally to at least two different calibration positions having at least two different longitudinal coordinates within the range of measurement;
(ii) recording, for each of the at least two different calibration positions, at least one first longitudinal sensor signal generated by a first longitudinal optical sensor and at least one second longitudinal sensor signal generated by a second longitudinal optical sensor;
(iii) forming, for each of the at least two different calibration positions, at least one calibration signal using the at least one first longitudinal sensor signal and the at least one second longitudinal sensor signal; and
(iv) generating a calibration function using the at least one calibration signal, the calibration function defining a relationship between a longitudinal coordinate of the at least one object and the at least one first longitudinal sensor signal and the at least one second longitudinal sensor signal;
wherein the method further comprises at least one adjustment step for positioning the first longitudinal optical sensor and the second longitudinal optical sensor, the adjustment step comprising the following substeps:
a) positioning the object in at least one outermost position within the measurement range, the outermost position having a maximum longitudinal coordinate;
b) positioning the first longitudinal optical sensor at a longitudinal coordinate of a focused image plane;
c) positioning the object in at least one closest position within the measurement range, the closest position having a minimum longitudinal coordinate; and
d) positioning the second longitudinal optical sensor at a longitudinal coordinate of a focused image plane.

2. The method of claim 1, further comprising making at least one measurement, wherein the longitudinal coordinate of the at least one object is determined by using the calibration function.

3. The method of claim 1, wherein the at least one adjustment is performed before (i).

4. The method of claim 1, further comprising (v) positioning, suitable for positioning the first longitudinal optical sensor and the second longitudinal optical sensor, the positioning comprising:
   A) positioning the at least one object in at least one outermost position within the range of measurement, the at least one outermost position having a maximum longitudinal coordinate, and positioning the first longitudinal optical sensor at a longitudinal position between the at least one transfer device and the focal plane of the at least one transfer device; and
   B) positioning the second longitudinal optical sensor at a longitudinal coordinate of a focused image plane.

5. The method of claim 4, wherein A) comprises:
   A1) defining a sensor threshold for the at least one first longitudinal sensor signal;
   A2) moving the first longitudinal optical sensor towards the focal plane of the at least one transfer device and comparing the at least one first longitudinal sensor signal with the sensor threshold; and
   A3) positioning the first longitudinal optical sensor at a position at which the at least one first longitudinal sensor signal equals the sensor threshold.

6. The method of claim 4, wherein (v) is performed before (i).

7. A detector, suitable for determining a position of at least one object, wherein the detector constitutes a coordinate system in which an optical axis forms a z-axis, a direction parallel or antiparallel to the z-axis being a longitudinal direction, and a coordinate along the z-axis being a longitudinal coordinate, wherein the detector comprises:
   at least one transfer device, suitable for imaging the at least one object into an image plane, and having a focal plane;
   at least two longitudinal optical sensors, wherein each of the at least two longitudinal optical sensors has at least one sensor region and is designed to generate at least one longitudinal sensor signal in a manner dependent on an illumination of the respective sensor region by at least one light beam propagating from the at least one object to the detector, wherein the at least one longitudinal sensor signal, given the same total power of the illumination, is dependent on a beam cross-section of the at least one light beam in the respective sensor region; and
   at least one evaluation device,
   wherein the detector is adapted to move the at least one object subsequently to at least two different calibration positions having at least two different longitudinal coordinates within a range of measurement,
   wherein the at least one evaluation device is adapted to record, for each of the at least two different calibration positions, at least one first longitudinal sensor signal generated by a first longitudinal optical sensor and at least one second longitudinal sensor signal generated by a second longitudinal optical sensor,
   wherein the at least one evaluation device is adapted to form, for each of the at least two different calibration positions, at least one calibration signal using the at least one first longitudinal sensor signal and the at least one second longitudinal sensor signal, and
   wherein the at least one evaluation device is designed to generate a calibration function using the at least one calibration signal, the calibration function defining a relationship between a longitudinal coordinate of the at least one object and the at least one first longitudinal sensor signal and the at least one second longitudinal sensor signal:
   wherein the detector is adapted to perform at least one adjustment step for positioning the first longitudinal optical sensor and the second longitudinal optical sensor, the adjustment step comprising the following sub-steps:
   a) positioning the object in at least one outermost position within the measurement range, the outermost position having a maximum longitudinal coordinate:
   b) positioning the first longitudinal optical sensor at a longitudinal coordinate of a focused image plane;
   c) positioning the object in at least one closest position within the measurement range, the closest position having a minimum longitudinal coordinate; and
   d) positioning the second longitudinal optical sensor at a longitudinal coordinate of a focused image plane.

8. The detector of claim 7, wherein the at least one evaluation device is designed to generate at least one item of information on a longitudinal position of the at least one object by evaluating at least one longitudinal sensor signal.

9. The detector of claim 7, wherein the detector is adapted to perform positioning suitable for positioning the first longitudinal optical sensor and the second longitudinal optical sensor, the positioning comprising:
   A) positioning the first longitudinal optical sensor at a longitudinal position between the at least one transfer device and a focal plane of the at least one transfer device; and
   B) positioning the second longitudinal optical sensor at a longitudinal coordinate of a focused image plane.

10. The detector of claim 9, wherein A) comprises:
    A1) defining a sensor threshold for the at least one first longitudinal sensor signal;
    A2) moving the first longitudinal optical sensor toward the focal plane of at least one transfer device and comparing the at least one first longitudinal sensor signal with the sensor threshold; and
    A3) positioning the first longitudinal optical sensor at a position at which the at least one first longitudinal sensor signal equals the sensor threshold.

11. The detector of claim 7, wherein at least one of the at least two longitudinal optical sensors is at least partially transparent.

12. The detector of claim 11, wherein the detector comprises at least one imaging device and is adapted to image the at least one object through the at least two longitudinal optical sensors.

13. A detector system, suitable for determining a position of at least one object, wherein the detector system comprises:
    at least one detector of claim 7, and
    at least one beacon device adapted to direct at least one light beam towards the at least one detector,
    wherein the at least one beacon device is at least one of attachable to the at least one object, holdable by the at least one object and integratable into the at least one object.

14. A human-machine interface, suitable for exchanging at least one item of information between a user and a machine, wherein the human-machine interface comprises at least one detector of claim 7, wherein the human-machine interface is designed to generate at least one item of geometrical information of a user with the at least one detector, and wherein the human-machine interface is designed to assign to the at least one item of geometrical information at least one item of information.

15. An entertainment device, suitable for carrying out at least one entertainment function, wherein the entertainment device comprises at least one human-machine interface of claim 14, wherein the entertainment device is designed to enable at least one item of information to be input by a player using the human-machine interface and wherein the entertainment device is designed to vary the at least one entertainment function in accordance with the at least one item of information.

16. A tracking system, comprising at least one detector of claim 7 and being suitable for tracking a position of the at least one object, the tracking system further comprising at least one track controller, wherein the at least one track controller is adapted to track a series of positions of the at least one object at specific points in time.

17. A camera, comprising at least one detector of claim 7 and being suitable for imaging the at least one object.

18. A method of detecting, the method comprising illuminating the detector of claim 7 with the at least one light beam.

* * * * *